(12) United States Patent
Son

(10) Patent No.: US 10,464,396 B2
(45) Date of Patent: Nov. 5, 2019

(54) AIR CONDITIONER, VEHICLE INCLUDING THE SAME, AND METHOD FOR CONTROLLING THE AIR CONDITIONER

(71) Applicants: Hyundai Motor Company, Seoul (KR); Kia Motors Corporation, Seoul (KR)

(72) Inventor: Ji Wan Son, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 79 days.

(21) Appl. No.: 15/677,893

(22) Filed: Aug. 15, 2017

(65) Prior Publication Data

US 2018/0290519 A1    Oct. 11, 2018

(30) Foreign Application Priority Data

Apr. 5, 2017 (KR) .................. 10-2017-0044241

(51) Int. Cl.
*B60H 1/32* (2006.01)

(52) U.S. Cl.
CPC ......... *B60H 1/3211* (2013.01); *B60H 1/3222* (2013.01); *B60H 2001/325* (2013.01); *B60H 2001/3241* (2013.01); *B60H 2001/3245* (2013.01); *B60H 2001/3248* (2013.01); *B60H 2001/3255* (2013.01); *B60H 2001/3261* (2013.01); *B60H 2001/3266* (2013.01); *B60H 2001/3272* (2013.01); *B60H 2001/3275* (2013.01)

(58) Field of Classification Search
CPC ............... B60H 1/3711; B60H 1/3722; B60H 2001/3241; B60H 2001/3245; B60H 2001/3248; B60H 2001/325; B60H 2001/3255; B60H 2001/3261; B60H 2001/3266; B60H 2001/3272; B60H 2001/3275; B60H 1/3211; B60H 1/3222
USPC ................................................ 62/227, 228.5
See application file for complete search history.

(56) References Cited

U.S. PATENT DOCUMENTS

| | | | | |
|---|---|---|---|---|
| 2001/0053326 | A1* | 12/2001 | Matsubara | .......... F04B 27/1072 417/222.1 |
| 2005/0207905 | A1* | 9/2005 | Koelzer | .............. F04B 27/1063 417/269 |
| 2015/0367711 | A1* | 12/2015 | Fuke | .................. B60H 1/00764 62/133 |

* cited by examiner

*Primary Examiner* — Marc E Norman
(74) *Attorney, Agent, or Firm* — Morgan, Lewis & Bockius LLP

(57) ABSTRACT

An air-conditioner may include an evaporator, a compressor configured to compress refrigerant supplied to the evaporator and a clutch configured to transmit power needed to operate the compressor to the compressor or to prevent power from being supplied to the compressor, wherein the clutch prevents power from being supplied to the compressor when an actual measurement temperature of the evaporator reaches a lower limit threshold temperature selected among the lower limit threshold temperature and an upper limit threshold temperature and the lower limit threshold temperature is changeable, and the upper limit threshold temperature is relatively higher than the lower limit threshold temperature and is changeable.

26 Claims, 15 Drawing Sheets

AIR CONDITIONER, VEHICLE INCLUDING THE SAME, AND METHOD FOR CONTROLLING THE AIR CONDITIONER

CROSS-REFERENCE TO RELATED APPLICATION

The present application claims priority to Korean Patent Application No. 10-2017-0044241, filed on Apr. 5, 2017, the entire contents of which is incorporated herein for all purposes by this reference.

BACKGROUND OF THE INVENTION

Field of the Invention

The present invention relates to an air-conditioner, a vehicle including the same, and a method for controlling the air-conditioner.

Description of Related Art

A vehicle is a machine which travels on roads or tracks to carry people or objects from place to place. Vehicles may travel on roads or tracks according to rotation of at least one wheel mounted to a vehicle body and frictional force between each wheel and the ground, and may carry people or objects from place to place. Such vehicles may include, for example, a three-wheeled or four-wheeled vehicle, a two-wheeled vehicle such as a motorcycle, a motorized bicycle, construction equipment, a bicycle, a train traveling on rails, and the like.

An air-conditioner to adjust the temperature of the indoor space of the vehicle by supplying cold air or warm air to the indoor space of the vehicle may be installed in an indoor space of the vehicle. Generally, the air-conditioner may include a compressor, a condenser, an expansion valve, and a heat-exchanger. The compressor, the condenser, the expansion valve, and the heat-exchanger may be coupled to each other through at least one refrigerant flow passage. The refrigerant may sequentially flow through the compressor, the condenser, the expansion valve, and the heat-exchanger along the refrigerant flow passage. The air-conditioner may acquire cold air or warm air according to a status change of the flowing refrigerant. The acquired cold air or warm air may be supplied to the indoor space of the vehicle through a fan.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air-conditioner configured to be more efficiently and economically operable by properly controlling a clutch connected to a compressor, a vehicle including the air-conditioner, and a method for controlling the air-conditioner.

Additional aspects of the invention will be set forth in part in the description which follows and, in part, will be obvious from the description, or may be learned by practice of the invention.

An air-conditioner may include an evaporator, a compressor configured to compress refrigerant supplied to the evaporator and a clutch configured to transmit power needed to operate the compressor to the compressor or to prevent power from being supplied to the compressor, wherein the clutch prevents power from being supplied to the compressor when an actual measurement temperature of the evaporator reaches a lower limit threshold temperature selected among the lower limit threshold temperature and an upper limit threshold temperature and the lower limit threshold temperature is changeable, and the upper limit threshold temperature is relatively higher than the lower limit threshold temperature and is changeable.

After preventing power from being supplied to the compressor, when the actual measurement temperature of the evaporator reaches the upper limit threshold temperature, the clutch may be configured to provide the compressor with power needed to operate the compressor.

The clutch may be configured to operate until the temperature of the evaporator reaches a target temperature or an approximate value of the target temperature.

After the temperature of the evaporator reaches the target temperature or the approximate value of the target temperature, when the actual measurement temperature of the evaporator reaches the lower limit threshold temperature, the clutch may be configured to prevent power from being supplied to the compressor.

At least one of the lower limit threshold temperature and the upper limit threshold temperature may be determined on the basis of a user-selected predetermined temperature and a user-selected set wind speed.

The lower limit threshold temperature is set to a relatively low threshold temperature and the upper limit threshold temperature is set to a relatively high threshold temperature when the predetermined temperature is relatively low or when the set wind speed is relatively high.

The lower limit threshold temperature is set to a relatively high threshold temperature and the upper limit threshold temperature is set to a relatively low threshold temperature when the predetermined temperature is relatively high or when the set wind speed is relatively low.

When the actual measurement temperature of the evaporator is lower than the lower limit threshold temperature, the clutch may prevent power from being supplied to the compressor.

The compressor may include a swash plate in which a tilt angle is fixed.

The compressor may include a swash plate in which a tilt angle is changeable, and the clutch may operate according to the lower limit threshold temperature and the upper limit threshold temperature when the swash plate includes a minimum tilt angle.

A target temperature may be determined using at least one of an indoor temperature, an outdoor temperature, a refrigerant pressure, an indoor humidity, a temperature of the evaporator, a predetermined temperature, and a set wind speed and the clutch may transmit power to the compressor until the temperature of the evaporator reaches the target temperature.

A vehicle may include an evaporator, a compressor configured to compress refrigerant supplied to the evaporator, a clutch configured to transmit power needed to operate the compressor to the compressor or to prevent power from being supplied to the compressor and a controller configured to determine a target temperature, a lower limit threshold temperature, and an upper limit threshold temperature, and to control the clutch to prevent power from being supplied to the compressor when an actual measurement temperature of the evaporator reaches the lower limit threshold temperature, wherein the lower limit threshold temperature is changeable, and the upper limit threshold temperature is relatively higher than the lower limit threshold temperature and is changeable.

The clutch may be configured to operate according to the lower limit threshold temperature and the upper limit threshold temperature only when a vehicle is running.

The vehicle may further comprise a user interface (UI) configured to receive information regarding a user-selected predetermined temperature and a user-selected set wind speed.

The vehicle may further comprise a detector configured to detect at least one of an indoor temperature, an outdoor temperature, a refrigerant pressure, an indoor humidity, and a temperature of the evaporator.

After preventing power from being supplied to the compressor, when the actual measurement temperature of the evaporator reaches the upper limit threshold temperature, the controller may control the clutch to provide the compressor with power needed to operate the compressor.

A method for controlling an air-conditioner may comprise determining a lower limit threshold temperature and an upper limit threshold temperature, acquiring an actual measurement temperature of an evaporator, and when the actual measurement temperature of the evaporator reaches a lower limit threshold temperature selected among an upper limit threshold temperature and the lower limit threshold temperature, allowing the clutch connected to a compressor to prevent power from being supplied to the compressor, wherein the lower limit threshold temperature is changeable, and the upper limit threshold temperature is relatively higher than the lower limit threshold temperature and is changeable.

The method may further comprise after preventing power from being supplied to the compressor, when the actual measurement temperature of the evaporator reaches the upper limit threshold temperature, transmitting, by the clutch, power needed to operate the compressor to the compressor.

The determining the lower limit threshold temperature and the upper limit threshold temperature may include receiving information regarding a predetermined temperature and a set wind speed and determining the lower limit threshold temperature and the upper limit threshold temperature on the basis of the predetermined temperature and the set wind speed.

The determining at least one of the lower limit threshold temperature and the upper limit threshold temperature on the basis of the predetermined temperature and the set wind speed may include when the predetermined temperature is relatively low or when the set wind speed is relatively high, determining the lower limit threshold temperature to be a relatively low threshold temperature, and determining the upper limit threshold temperature to be a relatively high threshold temperature.

The determining at least one of the lower limit threshold temperature and the upper limit threshold temperature on the basis of the predetermined temperature and the set wind speed may include when the predetermined temperature is relatively high or when the set wind speed is relatively low, determining the lower limit threshold temperature to be a relatively high threshold temperature, and determining the upper limit threshold temperature to be a relatively low threshold temperature.

The method may further comprise when the actual measurement temperature of the evaporator is lower than the lower limit threshold temperature, allowing the clutch to prevent power from being supplied to the compressor.

The compressor includes a swash plate in which a tilt angle is fixed.

The compressor includes a swash plate in which a tilt angle is changeable, the method may further comprise determining whether a tilt angle of the swash plate is a minimum tilt angle.

The allowing the clutch connected to the compressor to prevent power from being supplied to the compressor when the actual measurement temperature of the evaporator reaches the lower limit threshold temperature selected among the upper limit threshold temperature and the lower limit threshold temperature may be conducted when the tilt angle of the swash plate is a minimum tilt angle.

The method may further comprise determining a target temperature using at least one of an indoor temperature, an outdoor temperature, a refrigerant pressure, an indoor humidity, a temperature of the evaporator, a predetermined temperature, and a set wind speed.

The method may further comprise determining whether the temperature of the evaporator reaches the target temperature or an approximate value of the target temperature.

The method may further comprise allowing the clutch to transmit power needed to operate the compressor to the compressor until the temperature of the evaporator reaches the target temperature or the approximate value of the target temperature.

The method may further comprise determining whether or not a vehicle is running.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
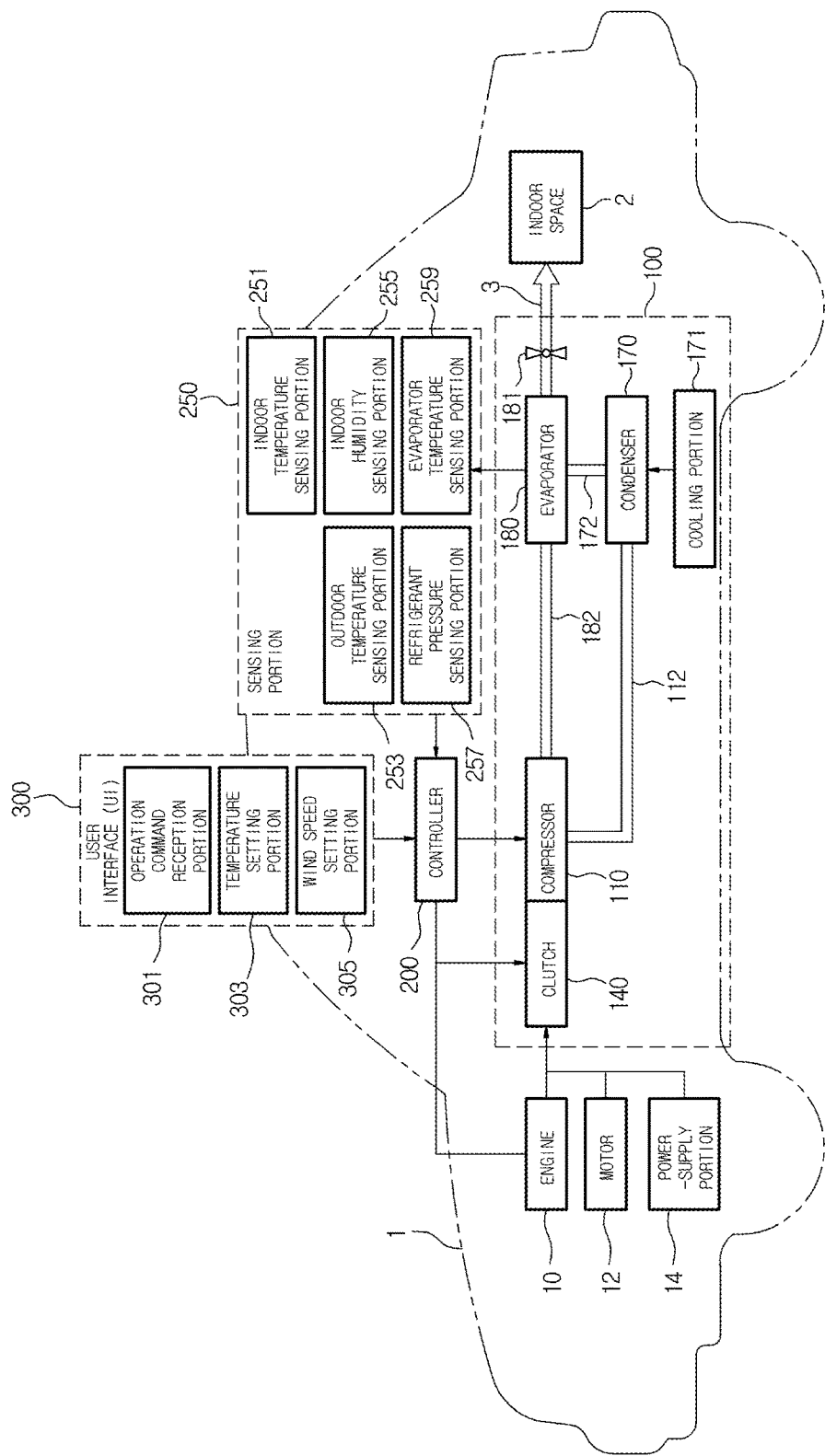
FIG. 1 is a block diagram illustrating a vehicle and an air-conditioner disposed therein according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the embodiments of the present invention, examples of which are illustrated in the accompanying drawings, wherein like reference numerals refer to like elements throughout. An air-conditioner and a vehicle including the same according to one exemplary embodiment of the present invention will hereinafter be described with reference to FIGS. 1 to 13.

FIG. 1 is a block diagram illustrating a vehicle and an air-conditioner disposed therein according to an exemplary embodiment of the present invention.

Referring to FIG. 1, a vehicle 1 may move from one place to another. For example, the vehicle 1 may travel on roads or tracks according to rotation of at least one wheel 4 and frictional force between each wheel 4 and the ground.

In accordance with one embodiment, the vehicle 1 may convert thermal energy produced by combustion of fossil fuels into mechanical energy using an engine, and may acquire power needed to rotate the wheels 4 using the mechanical energy.

In accordance with another exemplary embodiment of the present invention, the vehicle 1 may be an electric vehicle. Various electric vehicles may be used, for example, a general electric vehicle (EV) configured to acquire power only using electrical energy, a hybrid electric vehicle (HEV) configured to acquire power not only using thermal energy produced by combustion of fossil fuels but also using electrical energy, and a Plug-in Hybrid Electric Vehicle (PHEV) configured to use both thermal energy produced by combustion of fossil fuels and electrical energy, and charge a battery embedded therein upon receiving electrical energy from outside.

Referring to FIG. 1, the vehicle 1 may include an indoor space 2 in which a driver and passenger are present, an air-conditioner 100 to provide cold air or warm air to the indoor space 2, and a controller 200 to control the air-conditioner 100. The air-conditioner 100 according to one exemplary embodiment of the present invention may include a compressor, a clutch 140 to control the compressor 110, a condenser 170, and an evaporator 180. The air-conditioner 100 may further include a first flow passage 112 to interconnect the compressor 110 and the condenser 170, a second flow passage 172 to interconnect the condenser 170 and the evaporator 180, and a third flow passage 182 to interconnect the evaporator 180 and the compressor 110.

The compressor 110, the first flow passage 112, the condenser 170, the second flow passage 172, the evaporator 180, and the third flow passage 182 may be provided such that refrigerant can flow in a predetermined direction thereof.

Various refrigerants may be used, for example, chlorofluorocarbons (CFCs), hydrochlorofluorocarbons (HCFCs), hydroflurocarbon (HFC), carbon dioxide, ammonia, water, air, azeotropic refrigerants, chloromethyl refrigerants, or the like. However, the scope or spirit of the refrigerant according to an exemplary embodiment of the present invention is not limited thereto, and various materials configured for being selected by a system designer may also be used as the refrigerant.

The compressor 110 may receive a low-pressure gaseous refrigerant through the third flow passage 182 connected to the evaporator 180, and may convert the received refrigerant into a high-temperature high-pressure gas. The high-pressure high-temperature gas may be supplied to the condenser 170 through the first flow passage 112.

For example, the compressor 110 may be implemented using at least one of a fixed swash plate compressor, an internal swash plate compressor, and an external swash plate compressor.

The clutch 140 may be connected to the compressor 110, may operate the compressor 110 by transmitting power of the engine 10 to the compressor 110 under control of the controller 200, and may stop the compressor 110 by blocking supply of power to the compressor 110.

The operations of the compressor 110 and the clutch 140 will hereinafter be given.

The condenser 170 may cool a high-temperature high-pressure gaseous refrigerant received from the compressor 110, such that high-temperature high-pressure gas can be liquefied into a liquid refrigerant. While refrigerant is liquefied in the outdoor heat-exchanger 11, heat is emitted from the refrigerant to the outside, resulting in reduction in a temperature of the refrigerant. The refrigerant cooled in the condenser 170 may be supplied to the evaporator 180 through the second flow passage 172.

In accordance with one embodiment, the air-conditioner 100 may further include a cooling portion 171 to cool the condenser 170. The cooling portion 171 may cool the condenser 170 using air or water. The cooling portion 171 may further include a cooling fan as necessary.

In accordance with one embodiment, at least one of an expansion valve and a drying machine may further be disposed between the condenser 170 and the evaporator 180.

The expansion valve may expand a high-temperature high-pressure liquid refrigerant, and may thus discharge a refrigerant in which a low-temperature low-pressure gaseous refrigerant and a low-temperature low-pressure liquid refrigerant are mixed with each other.

In addition, the expansion valve 160 may be configured to regulate the amount of refrigerant flowing into the evaporator 180.

Refrigerant discharged from the condenser 170 may include both a gaseous refrigerant and a liquid refrigerant. The drying machine may separate the gaseous refrigerant and the liquid refrigerant from each other, and may transmit only the liquid refrigerant to the evaporator 180.

The evaporator 180 may be configured to discharge cold air or warm air 3 using the refrigerant received from the condenser 170. The evaporator 180 may include a flow passage through which refrigerant flows. The flow passage may be implemented using a tube formed of metal or synthetic resin. The tube may be bent several times such that the tube may be formed in a zigzag shape.

In more detail, while the refrigerant passes through the evaporator 180, the refrigerant is evaporated by absorbing latent heat, resulting in reduction of the ambient air temperature of the evaporator 180. Accordingly, cold air may be generated in a peripheral region of the evaporator 180, such that the cold air may flow into the indoor space 2 by operation of a fan 181. Therefore, a temperature of the indoor space 2 can be adjusted. Refrigerant discharged from the evaporator 180 may be retransmitted to the compressor 110 through the third flow passage 182.

The controller 200 may perform electronic control of various constituent components disposed in the vehicle 1.

The controller 200 may include a Central Processing Unit (CPU) or a Micro Controller Unit (MCU), or may include an Electronic Control Unit (ECU). The CPU, the MCU, or the ECU may be implemented using one or more semiconductor chips or associated constituent components. In addition, the CPU, the MCU, or the ECU may process various operations of the vehicle 1 on the basis of programs or data embedded or entered by the user.

The CPU, the MCU, or the ECU may be disposed at a certain position of the indoor space of the body 2 according to selection of the designer. For example, the CPU, the MCU, or the ECU may be disposed at a substrate mounted to the space between a dashboard and an engine compartment.

Figure 2:
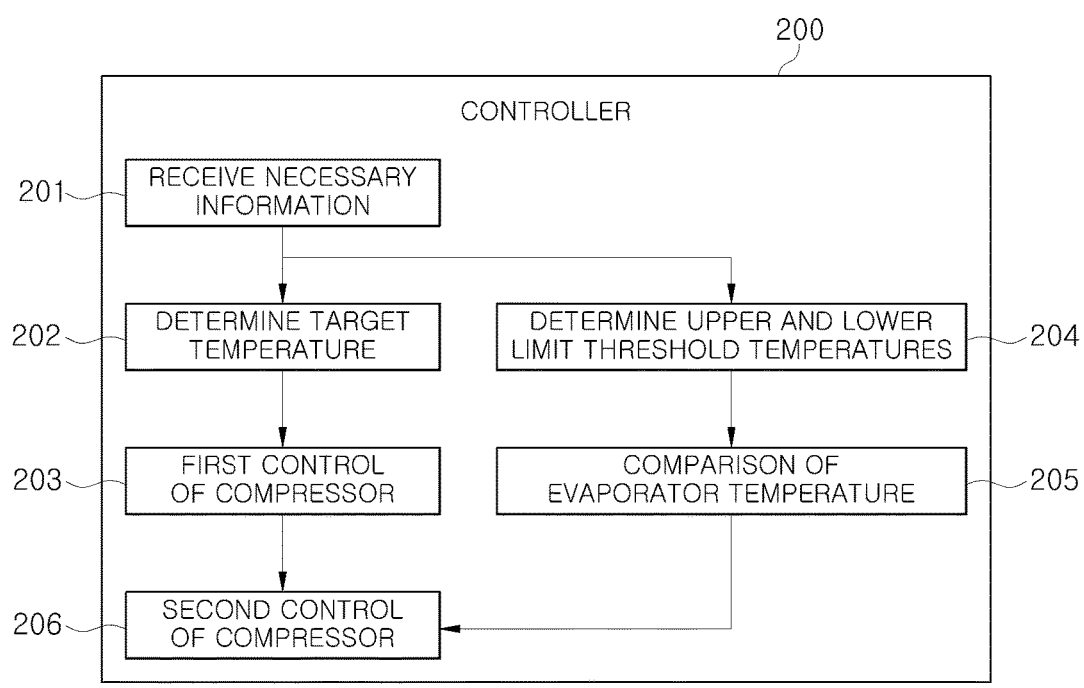
FIG. 2 is a conceptual diagram illustrating the operations of the controller.

FIG. 2 is a conceptual diagram illustrating the operations of the controller.

Referring to FIG. 1, the controller 200 may receive (201) information needed to determine (202) a target temperature or information needed to determine (204) a lower limit threshold temperature and an upper limit threshold temperature. For example, the controller 200 may receive information needed to determine a target temperature from at least one of a user interface 300 and a detecting portion 250, and may receive information needed to determine (204) a lower limit threshold temperature and an upper limit threshold temperature from a temperature setting portion 303 and a wind speed setting portion 305 of the user interface 300.

The controller 200 may determine a target temperature of the evaporator 180 using the received information (202).

For example, the controller 200 may determine a target temperature of the evaporator 180 using a user-set temperature, a wind speed, or operation states of the compressor 110.

Figure 3:
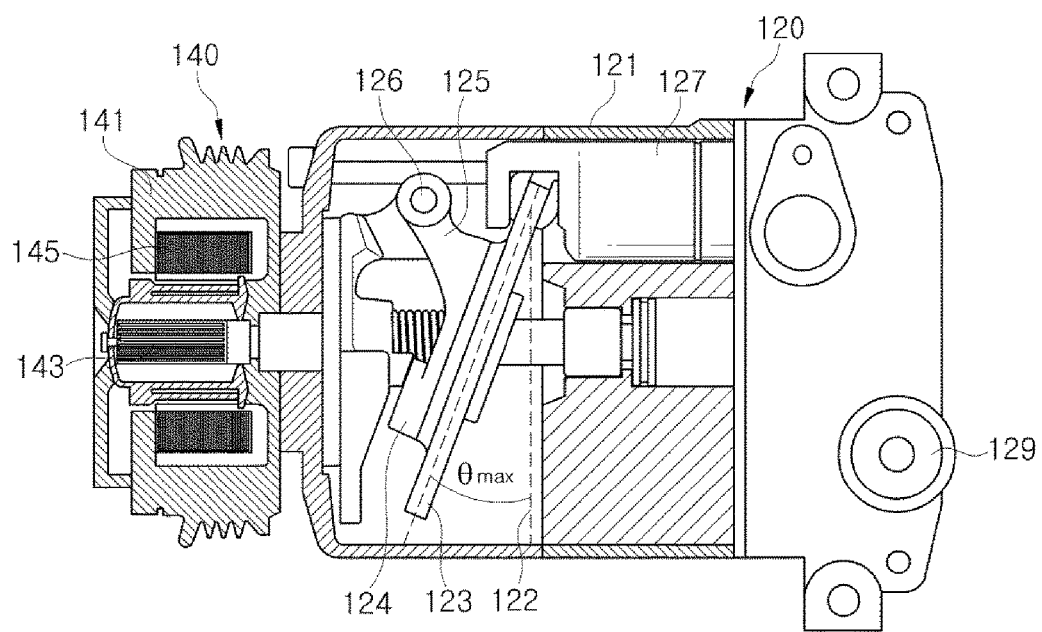
FIG. 3 is a view illustrating a compressor according to various exemplary embodiments of the present invention.
Figure 4:
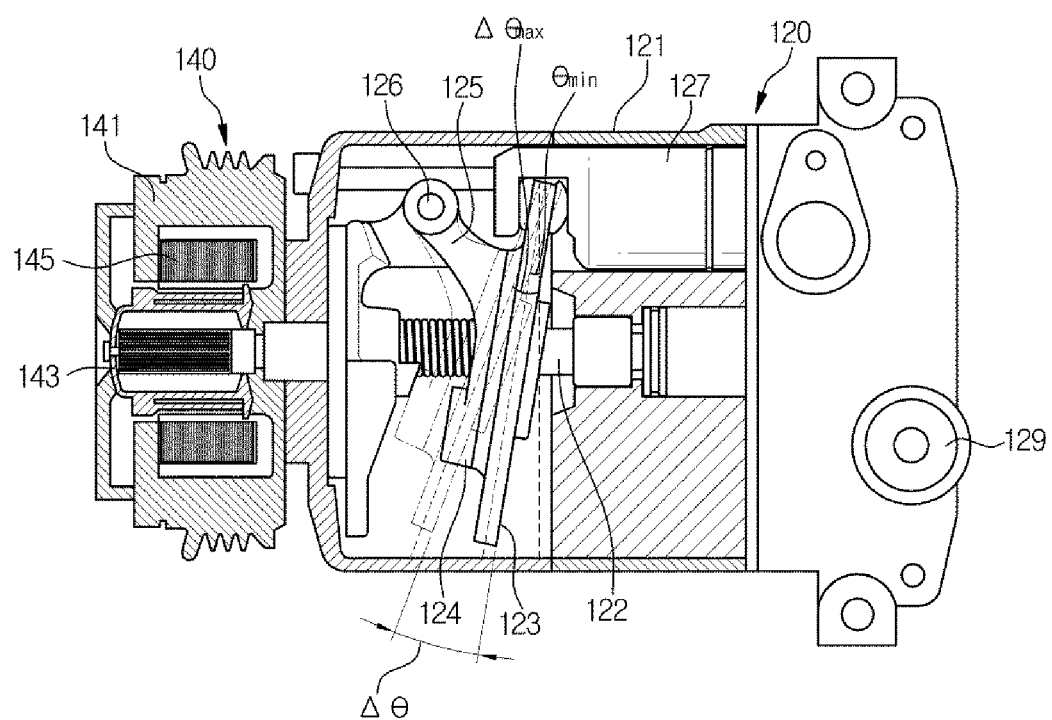
FIG. 4 is a view illustrating operations of the compressor according to various exemplary embodiments of the present invention.

In addition, the controller 201 may determine a target temperature of the evaporator 180 using a duty ratio of a swash plate controller 129 (see FIG. 3 and FIG. 4).

When a target temperature of the evaporator 180 is determined, the controller 200 may control the clutch 140 to operate the compressor until the ambient air temperature of the evaporator 180 reaches the target temperature (203). In the instant case, the controller 200 may further control the compressor 110.

In addition, the controller 200 may also determine a lower limit threshold temperature and an upper limit threshold temperature using the received information (204). The lower limit threshold temperature may denote a temperature at which the compressor 110 stops operation, and the upper limit threshold temperature may denote a temperature at which the compressor 110 starts operation. The upper limit threshold temperature may be higher than the lower limit threshold temperature.

For example, the controller 200 may determine the lower limit threshold temperature and the upper limit threshold temperature on the basis of a predetermined temperature decided by the user or a wind speed.

When the predetermined temperature is relatively low and the wind speed is relatively high, the controller 200 may set the lower limit threshold temperature to a relatively low temperature, and may set the upper limit threshold temperature to a relatively high temperature. In contrast, when the predetermined temperature is relatively high and the wind speed is relatively low, the controller 200 may set the lower limit threshold temperature to a relationship high temperature, and may set the upper limit threshold temperature to a relatively low temperature.

In more detail, for example, when the predetermined temperature is the lowest temperature and the wind speed is the highest wind speed, the controller 200 may set the lower limit threshold temperature to the lowest temperature within a predefined range, and may set the upper limit threshold temperature to the highest temperature within a predefined range. In addition, when the predetermined temperature is the highest temperature and the wind speed is the lowest wind speed, the controller 200 may set the lower limit threshold temperature to the highest temperature within a predefined range, and may set the upper limit threshold temperature to the lowest temperature within a predefined range.

When the predetermined temperature is set to a certain value between the highest temperature and the lowest temperature and the wind speed is set to a certain value between the highest wind speed and the lowest wind speed, the controller 200 may determine the lower limit threshold temperature and the upper limit threshold temperature using the predefined function. For example, the controller 200 may determine the lower limit threshold temperature and the upper limit threshold temperature not only using a function and a predetermined temperature of the lower limit threshold temperature regarding the predetermined temperature and the wind speed, but also using a function of the upper limit threshold temperature regarding the predetermined temperature and the wind speed. At least one of the function of the upper limit threshold temperature regarding the wind speed and the function and the predetermined temperature regarding the predetermined temperature and the wind speed may be a linear function.

In other words, the lower limit threshold temperature and the upper limit threshold temperature may be established by the user, or may be changeable according to the set wind speed.

In accordance with one embodiment, the lower limit threshold temperature may also be defined as a lower limit of a hysteresis curve regarding a refrigerant temperature and a pressure change of the air-conditioner 100, and the upper limit threshold temperature may also be defined as an upper limit of the hysteresis curve.

The controller 200 may perform decision 204 of the lower limit threshold temperature and the upper limit threshold temperature, before determining (202) the target temperature of the evaporator 180 or controlling (203) the compressor 110, after determining (202) the target temperature of the evaporator 180 or controlling (203) the compressor 110, or simultaneously with determining (202) the target temperature of the evaporator 180 or controlling (203) the compressor 110.

After a temperature of the evaporator 180 or an actual measurement temperature of the ambient air of the evaporator 180 reaches a target temperature or an approximate value of the target temperature through the operation of the compressor 110, the controller 200 may compare the temperature of the evaporator 180 or the actual measurement temperature of the ambient air of the evaporator 180 with the lower limit threshold temperature and the upper limit threshold temperature (205), and may control the clutch 140 on the basis of the result of comparison, such that the compressor 110 may start or stop operation (206).

The controller 200 may compare the actual measurement temperature with the lower limit threshold temperature. When the actual measurement temperature reaches the lower limit threshold temperature, the clutch 140 may stop supply of power to the compressor 110 such that the compressor 110 may not operate.

The controller 200 may compare the actual measurement temperature with the upper limit threshold temperature. When the actual measurement temperature reaches the upper limit threshold temperature, the controller 200 may control the clutch 140 to transmit power to the compressor 110 such that the compressor can operate.

Comparison between the upper limit threshold temperature and the actual measurement temperature may be conducted after comparison between the lower limit threshold temperature and the actual measurement temperature. In other words, only when the temperature of the evaporator 180 or the actual measurement temperature of the ambient air of the evaporator 180 reaches the upper limit threshold temperature according to lapse of time, the controller 200 may control the compressor 110 to operate.

After the compressor 110 stops operation because power applied to the compressor 110 is stopped, the controller 200 may compare the actual measurement temperature with the upper limit threshold temperature, and may control the clutch 140 to transmit power to the compressor 110 according to the result of comparison. In the instant case, when the compressor 110 stops operation, the controller 200 may perform comparison between the actual measurement temperature and the upper limit threshold temperature in response to the stopped compressor 110, and may determine whether to restart the compressor 110 according to the actual measurement temperature after the compressor 110 stops operation.

The controller 200 may control the clutch 140 to repeatedly apply power to the compressor 110 or to prevent power from being supplied to the compressor 110 according to the lower limit threshold temperature and the upper limit threshold temperature, and may control the compressor 110 to repeatedly operate or to stop operation.

A detailed description of the controller 200 according to categories of the compressor 110 will hereinafter be given.

The above-mentioned operations 201 to 206 may be implemented using at least one program. In the instant case, the controller 200 may be designed to perform the above operations 201 to 206 after calling a program stored in a storage device. Alternatively, the controller 200 may be pre-programmed to perform the above operations 201 to 206.

In accordance with one embodiment, as shown in FIG. 1, the vehicle 1 may further include at least one of the detecting portion 250 and the user interface 300.

The detecting portion 250 and the user interface 200 may communicate with the controller 200. In the instant case, the detecting portion 250 and the user interface 300 may communicate with each other using a communication cable or a wireless communication network. The wireless communication network may be implemented using at least one of a short-range communication network and a mobile communication network. The short-range communication network may be implemented using at least one of CAN communication, Wi-Fi, Wi-Fi Direct (WFD), ZigBee, Bluetooth, Bluetooth Low Energy (BLE), and Near Field Communication (NFC). The mobile communication network may be implemented using any of various communication technologies based on various mobile communication protocols, for example, 3GPP, 3GPP2, World Interoperability for Microwave Access (WiMAX), etc.

The detecting portion 250 may detect and collect various information needed to control the air-conditioner 100.

For example, as shown in FIG. 1, the detecting portion 250 may include at least one of an indoor temperature detecting portion 251, an outdoor temperature detecting portion 253, an indoor humidity detecting portion 255, a refrigerant pressure detecting portion 257, and an evaporator temperature detecting portion 259.

The indoor temperature detecting portion 251 may detect and measure a temperature of the indoor space 2, and may transmit an electrical signal indicating the detection and measurement result to the controller 200. The indoor temperature detecting portion 251 may be implemented using a bimetal thermometer, thermistor thermometer, an infrared thermometer, etc. disposed in the vehicle 1 such that the temperature of the indoor space 2 can be properly measured.

The outdoor temperature detecting portion 253 may detect and measure the outdoor temperature of the vehicle 1, and may transmit the detection and measurement result to the controller 200. The outdoor temperature detecting portion 253 may be implemented using a thermometer disposed at a proper position (e.g., an external surface of the external frame of the vehicle 1) at which the outdoor temperature of the vehicle 1 can be measured. The outdoor temperature detecting portion 253 may be implemented using a bimetal thermometer, a thermistor temperature, or an infrared thermometer, etc.

The indoor humidity detecting portion 255 may detect humidity of the indoor space 2, and may transmit the detection result to the controller 200. For example, the indoor humidity detecting portion 255 may be implemented using a hair hygrometer or a psychrometer. For example, the indoor humidity detecting portion 255 may be disposed in the indoor space 2 of the vehicle 1.

The refrigerant pressure detecting portion 257 may measure a pressure of the refrigerant flowing into the air-conditioner 100. The refrigerant pressure detecting portion 257 may be disposed between the compressor 110 and the evaporator 180. In more detail, for example, the refrigerant pressure detecting portion 257 may be disposed between the compressor 110 and the third flow passage 182. In accordance with one embodiment, the refrigerant pressure detecting portion 257 may be implemented using any one of a piezoresistive pressure sensor, a capacitive pressure sensor, and a piezoelectric effect pressure sensor. The detecting result of the refrigerant pressure detecting portion 257 may be transferred to the controller 200.

The evaporator temperature detecting portion 259 may detect a temperature of the evaporator 180 or a temperature of the ambient air around the evaporator 180, and may acquire the temperature of the evaporator 180 or the actual measurement temperature of the ambient air of the evaporator 180. The evaporator temperature detecting portion 259 may be implemented using a temperature detector brought into contact with the evaporator 180 or located close to the evaporator 180. For example, the temperature detector may include a bimetal thermometer, a thermistor thermometer, an infrared thermometer, etc. The detecting result of the evaporator temperature detector 259 may be transferred to the controller 200.

The user interface (UI) 300 may receive a command regarding the operation of the air-conditioner 100 from a user including a driver or passenger, and may provide the user with various information (e.g., a target temperature or an indoor temperature) related to the operation of the air-conditioner 100.

In accordance with one embodiment, as shown in FIG. 1, the user interface (UI) 300 may include at least one of an operation command reception portion 301, a temperature setting portion 303, and a wind speed setting portion 305.

The operation command reception portion 301 may receive a command for starting operation of the air-conditioner 100 or a command for stopping operation of the air-conditioner 100.

The temperature setting portion 303 may receive information regarding a user-desired target temperature of the indoor space 2 from the user.

In accordance with one embodiment, the temperature setting portion 303 may stepwise receive a target temperature (i.e., the predetermined temperature) of the indoor space 2. For example, when the user selects any one of plural steps defined by a designer, the temperature setting portion 30 may receive a predetermined temperature corresponding to the selected step. In the instant case, predetermined temperatures corresponding to the respective steps may be different from each other. In addition, the temperature setting portion 30 may directly receive a detailed numerical value regarding the predetermined temperature from the user.

The air-conditioner 100 may allow a temperature of the indoor space 2 to reach a target temperature or an approximate value of the target temperature according to an input target temperature.

The wind speed setting portion 305 may receive information regarding the velocity of air (i.e., the wind speed) flowing into the indoor space 2. In accordance with one embodiment, the wind speed setting portion 305 may discretely receive information regarding the wind speed according to respective steps, or may directly receive information regarding the wind speed according to respective steps. In addition, the wind speed received through the wind speed setting portion 305 may be set to an arbitrary value between a maximum wind speed and a minimum wind speed defined by the designer.

When the user selects a predetermined wind speed by the wind speed setting portion 305, the fan 181 of the air-conditioner 100 may rotate at an angular speed corresponding to the selected wind speed, and may direct cold air or warm air 3 to flow into the indoor space.

At least one of the operation command reception portion 301, the temperature setting portion 303, and the wind speed setting portion 305 will herein be omitted as necessary.

In accordance with one embodiment, the operation command reception portion 301, the temperature setting portion 303, and the wind speed setting portion 305 may be implemented using different input devices. In the instant case, each of the operation command reception portion 301, the temperature setting portion 303, and the wind speed setting portion 305 may be implemented using a physical button, a joystick, a knob, a trackball, a track pad, a touchpad, or the like.

In accordance with another exemplary embodiment, at least two of the operation command reception portion 301, the temperature setting portion 303, and the wind speed setting portion 305 may be implemented using one input device. For example, one touchscreen or one touchpad may be configured to perform all the functions of the operation command reception portion 301, the temperature setting portion 303, and the wind speed setting portion 305. The user may touch figures, letters, or other symbols displayed on the touchscreen such that the user can input a command for starting or stopping the air-conditioner 100, a detailed value regarding a target temperature, a detailed value for a target temperature, and a detailed value for the velocity of air.

In accordance with one embodiment, the vehicle 1 may further include at least one of an engine 10, a motor 12, and a power-supply portion 14.

The engine 10 may acquire power needed to rotate the wheels 4. In addition, the engine 10 may acquire power needed to operate the compressor 110. Rotational force acquired by the engine 10 may be transferred to or may not be transferred to the compressor 110 according to the operation of the clutch 140.

When the vehicle 1 is an electric vehicle, the motor 12 may acquire power needed to rotate the wheels 4, and may also acquire power needed to operate the compressor 110. In the same manner as described above, rotational force acquired by the motor 12 may or may not be transferred to the clutch 110 according to the operation of the clutch 140.

Any one of the engine 10 and the motor 12 will herein be omitted according to one embodiment.

The power-supply portion 14 may provide constituent elements mounted to the vehicle 1 with power. For example, the power-supply portion 14 may or may not provide the clutch 140 with power, such that the clutch 140 may provide the compressor with power needed to operate the compressor 110, or may prevent power from being supplied to the compressor 110.

One exemplary embodiment of the air-conditioner 100 and the controller 200 when the compressor is an external variable swash plate compressor will hereinafter be described.

FIG. 3 is a view illustrating a compressor according to various exemplary embodiments of the present invention. FIG. 4 is a view illustrating operations of the compressor according to various exemplary embodiments of the present invention.

Referring to FIG. 3, the compressor 120 according to the various exemplary embodiments may include a case member 121; a rotation axis member 122 configured to rotate; a swash plate coupled to the rotation axis member 122; a swash plate support portion 124 configured to support a swash plate; a swash plate angle adjusting member extension portion 125 configured to connect the swash plate support portion 124 to a swash plate adjusting member 126; a swash plate angle adjusting member 126 configured to adjust a tilt angle of the swash plate 123; a piston 127 having a groove in which some parts of the swash plate 123 can be inserted; and a swash plate controller 129 configured to control a rotation angle of the swash plate angle adjusting member 126.

The rotation axis member 122 may be connected to a rotation axis member 143 of the clutch 140, and may rotate in response to rotation of the rotation axis member 143 of the clutch 140.

The swash plate 123 may rotate in response to rotation of the rotation axis member 122. The swash plate may be formed in a circular plate shape.

Referring to FIG. 3 and FIG. 4, the swash plate 123 may be tilted at a predetermined angle with respect to a rotation axis of the swash plate 123. In more detail, the swash plate 123 may be tilted at a predetermined tilt angle θmax or θmin with respect to a flat surface orthogonal to the rotation axis of the swash plate 123. In the instant case, the tilt angle of the swash plate 122 may be adjustable within a predetermined range (Δθ).

The swash plate support portion 124 may support the swash plate 123, may transmit rotational force of the angle adjusting member extension portion 125 to the swash plate 123, such that the swash plate can rotate within a tilt angle of a predetermined range (Δθ).

The angle adjusting member extension portion 125 may be connected to the swash plate support portion 124, and may rotate within a predetermined angle according to a rotational motion of the swash plate angle adjusting member 126.

The swash plate adjusting member 126 may rotate according to control of the swash plate controller 129. For example, the swash plate adjusting member 126 may include a rotation axis member and a motor configured to rotate the rotation axis member. The motor may operate according to a control signal received from the swash plate controller 129, and may thus rotate the rotation axis member. The rotation axis member may be connected to the angle adjusting member extension portion 125, and the angle adjusting member extension 125 may rotate in response to rotation of the rotation axis member. The swash plate support portion 124 may move according to rotation of the angle adjusting member extension portion 125, such that the swash plate 124 may rotate within a tilt angle of a predetermined range (Δθ).

The swash plate controller 129 may transmit a control signal to the motor of the swash plate angle adjusting member 126 according to a control signal received from the controller 200. In more detail, when a tilt angle of the swash plate 123 needs to increase, the swash plate controller 129 may control the motor such that the rotation axis member rotates in a first rotation direction thereof. When a tilt angle of the swash plate 123 needs to be decreased, the swash plate controller 129 may control the motor such that a rotation axis member rotates in a second rotation direction opposite to the first rotation direction thereof.

For example, the swash plate controller 129 may be implemented using an electronic control valve (ECV).

The piston 127 may reciprocate in a predetermined range according to rotation of the swash plate 123.

A groove in which some parts of the swash plate 123 are inserted may be formed in some parts of the piston 127. Some parts of the swash plate 123 (for example, an external circumferential surface of the swash plate 123 and a peripheral portion thereof) may be inserted into the groove. The swash plate 123 may be tilted at a predetermined tilt angle. Therefore, when the swash plate 123 rotates along the rotation axis, the groove may move in response to rotation of the swash plate 123, and the piston 127 may also move within a predetermined range. Here, the predetermined range may correspond to the tilt angle of the swash plate 123.

Although FIG. 3 illustrates one example in which only one piston 127 is used for convenience of description, the number of pistons 127 is not limited thereto, two or more pistons 127 may also be mounted to the compressor 120 according to one embodiment.

A reciprocating motion range of the piston 127 may be changed in response to variation of the tilt angle of the swash plate 123.

When the tilt angle of the swash plate 123 is a maximum tilt angle (θmax) as shown in FIG. 3, the swash plate 123 may be tilted with respect to the piston 127, such that the piston 127 may move in a relatively larger range. Therefore, the compressor 120 may operate at a maximum swash plate status, and the amount of refrigerant discharged from the compressor 120 is maximized.

In contrast, when the tilt angle of the swash plate 123 is a maximum tilt angle (θmin) as shown in FIG. 4, the swash plate 123 may be tilted at a relatively small angle with respect to the piston 127, such that the piston 127 may move within a relatively small range. Therefore, the compressor 120 may operate at a minimum swash plate status, such that the amount of refrigerant discharged from the compressor is minimized.

When the tilt angle of the swash plate 123 is in the range from the minimum tilt angle (θmin) to the maximum tilt angle (θmax), the piston 127 may move within a range corresponding to the tilt angle of the swash plate 123, and the compressor 120 may discharge a refrigerant in response to the movement range of the piston 127.

The compressor 120 may be connected to the clutch 140. In accordance with one embodiment, the compressor 120 and the clutch 140 may be integrated into one body.

The clutch 140 may include a case member 141; a rotation axis member 143 rotatable in the case member 141; and a coil 145 fixed to the case member 141 in the vicinity of the rotation member 143.

A current (e.g., an alternating current) may flow in the coil 145 or may not flow in the coil 145. When current flows through the coil 141, a magnetic field corresponding to the flowing current may be formed in the vicinity of the coil 141.

When a magnetic field is formed in the vicinity of the coil 141, the rotation axis member 143 may rotate under a predetermined direction according to the magnetic field. The rotation axis member 143 is extended such that the rotation axis member 124 is coupled to the rotation axis member 122 of the compressor 120. Accordingly, the rotation axis member 122 of the compressor 120 may also rotate in response to rotation of the rotation axis member 143. In contrast, when the magnetic field is not formed in the vicinity of the coil 141, the rotation axis member 142 may not rotate, such that the rotation axis member 122 of the compressor 120 may also not rotate.

Therefore, the compressor 120 may start operation or may stop operation according to whether a current is applied to the coil 145 of the clutch 140.

Figure 5:
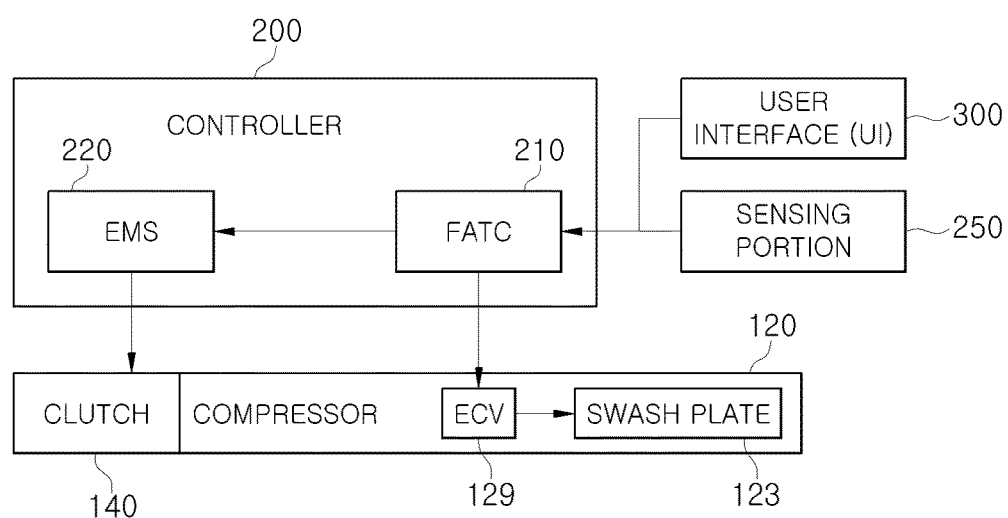
FIG. 5 is a conceptual diagram illustrating operations of the controller, the clutch, and the compressor according to various exemplary embodiments of the air-conditioner.

FIG. 5 is a conceptual diagram illustrating operations of the controller, the clutch, and the compressor according to various exemplary embodiments of the air-conditioner.

Referring to FIG. 5, the controller 200 according to one exemplary embodiment of the present invention may include a Full Automatic Temperature Controller (FATC) 210 and an Engine Management System (EMS) 220.

The FATC 210 may determine a target temperature of the evaporator 180 on the basis of information received from at least one of the detecting portion 250 and the user interface (UI) 300.

For example, the FATC 210 may establish a target temperature of the evaporator 180 on the basis of at least one of the indoor space 2's temperature acquired by the indoor temperature detecting portion 251, an outdoor temperature acquired by the outdoor temperature detecting portion 253, the indoor space 2's humidity acquired by the indoor humidity detecting portion 255, a refrigerant pressure acquired by the refrigerant pressure detecting portion 257, and an evaporator 180's temperature acquired by the evaporator temperature detecting portion 259.

The FATC 210 may transmit a control signal to the swash plate controller 129 of the compressor 120 according to the established target temperature, and may thus adjust a tilt angle of the swash plate 125.

For example, when there is a large difference between the indoor temperature and the target temperature, the FATC 210 may generate a control signal such that the tilt angle of the swash plate 125 is relatively high, such that the FATC 210 may transmit the control signal to the swash plate controller 129. Here, the tilt angle of the swash plate 125 may be, for example, a maximum angle.

When there is a little difference between the indoor temperature and the target temperature, the FATC 210 may generate a control signal such that the tilt angle of the swash plate 125 is relatively low, such that the FATC 210 may transmit the control signal to the swash plate controller 129. Here, the tilt angle of the swash plate 125 may be, for example, a minimum angle.

The FATC 210 may determine a duty ratio of the swash plate according to the established target temperature, may generate a control signal corresponding to the determined swash plate duty ratio, and may then transmit the generated control signal to the swash plate controller 129.

In addition, the FATC 210 may determine a lower limit threshold temperature and an upper limit threshold temperature on the basis of a user-selected predetermined temperature and a user-selected set wind speed received through the user interface (UI) 300.

When the predetermined temperature is relatively low and the set wind speed is high, the FATC 210 may set the lower limit threshold temperature to a relatively low threshold temperature, and may set the upper limit threshold temperature to a relatively high threshold temperature. When the predetermined temperature is relatively high and the set wind speed is low, the FATC 210 may set the lower limit threshold temperature to a relatively high threshold temperature, and may set the upper limit threshold temperature to a relatively low threshold temperature.

The FATC 210 may transmit information related to the operation of the clutch 140 or a control signal related to the operation of the clutch 140 to the engine management system (EMS) 220. The information or control signal related to the operation of the clutch 140 may be transferred using a cable or a wireless communication technology including CAN. For example, the information related to the operation of the clutch 140 may include information related to initiation/maintenance of the operation of the clutch 140 or information related to stoppage of the operation of the clutch 140.

When the tilt angle of the swash plate 125 is relatively high, the FATC 210 may transmit information related to the operation of the clutch 140 or a control signal related to the operation of the clutch 140 to the EMS 220 such that the clutch 140 can start operation or can continuously operate.

When the tilt angle of the swash plate 125 is relatively low, the FATC 210 may determine whether to start or stop operation of the clutch 140 on the basis of the lower limit threshold temperature and the upper limit threshold temperature, and may transmit the determined result to the EMS 220.

The EMS 220 may receive information related to the operation of the clutch 140 or a control signal related to the operation of the clutch 140 from the FATC 210, and may generate a control signal for the clutch 140 in response to the information or control signal related to the operation of the clutch 140. The generated control signal may be transferred to the clutch 140.

For example, upon receiving information needed to start or stop operation of the clutch 140 from the FATC 210, the EMS 220 may control the clutch 140 to start or stop operation, such that the clutch 140 can transmit power to the compressor 120. Therefore, the compressor 120 may start operation or may continuously operate.

In contrast, upon receiving information related to stoppage of the operation of the clutch 140 from the FATC 210, the EMS 220 may generate a control signal related to stoppage of the operation of the clutch 140, and may transmit the generated control signal to the clutch 140, such that the compressor 120 may stop operation.

A method for controlling a temperature of the evaporator 180 when the predetermined temperature is relatively low and the set wind speed is high will hereinafter be described with reference to the appended drawings.

Figure 6:
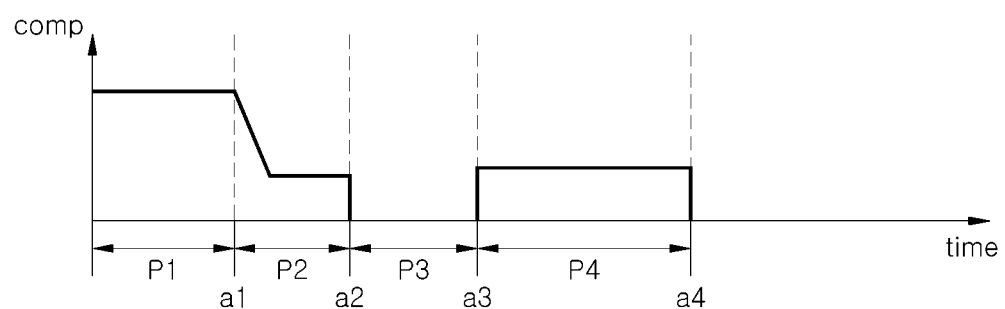
FIG. 6 is a conceptual diagram illustrating the change of power of the compressor according to the various exemplary embodiments of the present invention.
Figure 7:
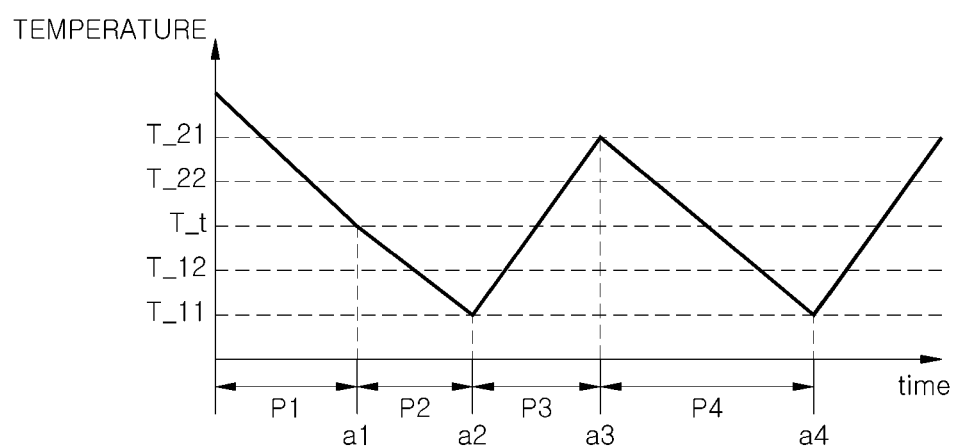
FIG. 7 is a first graph illustrating an exemplary operation of the air-conditioner according to the various exemplary embodiments of the present invention.

FIG. 6 is a conceptual diagram illustrating the change of power of the compressor according to the various exemplary embodiments of the present invention. FIG. 7 is a first graph illustrating an exemplary operation of the air-conditioner according to the various exemplary embodiments of the present invention. In FIG. 6 and FIG. 7, the X-axis denotes time. In FIG. 6, the Y-axis denotes the magnitude of power of the compressor 120. In FIG. 7, the Y-axis denotes a temperature of the evaporator, and a segment may denote change of temperature of the evaporator 180.

When the predetermined temperature is relatively low and the set wind speed is high, the FATC 210 may set the lower limit threshold temperature to a relatively low threshold temperature, and may set the upper limit threshold temperature to a relatively high threshold temperature. For convenience of description and better understanding of the present invention, the lower limit threshold temperature set to a relatively low threshold temperature will hereinafter be referred to as a first lower limit threshold temperature (T_11), and the upper limit threshold temperature set to a relatively high threshold temperature will hereinafter be referred to as a first upper limit threshold temperature (T_21).

When a target temperature (T_t) is established by the FATC 210, the tilt angle of the swash plate 125 may be determined to a relatively high angle according to control of the FATC 210. For example, the tilt angle of the swash plate 125 may be determined to a maximum angle.

Under the condition that the tilt angle of the swash plate 125 is a maximum angle, the clutch 140 may continuously transfer power to the compressor 120 during a first period (p1) according to control of the FATC 210 and the EMS 220. Therefore, the compressor 120 may continuously operate during the first period (p1) as shown in FIG. 6. A temperature of the evaporator 180 may abruptly decrease according to the operation of the compressor 120 as shown in FIG. 7, such that the temperature of the evaporator 180 may be identical to or may approximate to the target temperature (T_t) at a first time point (a1).

When the temperature of the evaporator 180 is identical to or approximates to the target temperature (T_t), the FATC 210 may transmit a control signal to the swash plate controller 129, resulting in reduction in the tilt angle of the swash plate 123. Therefore, the compressor 120 may discharge a relatively small amount of refrigerant during a second period (p2), such that the temperature of the evaporator 180 may be relatively smoothly reduced.

After the tilt angle of the swash plate 123 is reduced, the FATC 210 may compare the actual measurement temperature of the evaporator 180 with a predetermined first lower limit threshold temperature (T_11). Comparison between the actual measurement temperature and the first lower limit threshold temperature (T_11) may be performed periodically or at random. The first lower limit threshold temperature (T_11) may be performed simultaneously with setting of the target temperature (T_t) or after setting the target temperature (T_t).

When the temperature of the evaporator 180 reaches the first lower limit threshold temperature (T_11) (i.e., the second time point a2), the EMS 220 may generate a signal for stopping operation of the clutch 140 according to information or control signals received from the FATC 210, and may then transmit the generated signal to the clutch 140. Therefore, the clutch 140 may stop transmission of power to the compressor 120, movement of the refrigerant may also be stopped according to stoppage of the operation of the compressor 120, such that the temperature of the evaporator 180 may be gradually increased during a third period (p3).

After the clutch 140 stops transmission of power to the compressor 120, the FATC 210 may compare the actual measurement temperature of the evaporator 180 with the first lower limit threshold temperature (T_21). Comparison between the actual measurement temperature and the first lower limit threshold temperature (T_21) may be performed periodically or at random.

When the temperature of the evaporator 180 reaches a predetermined first upper limit threshold temperature (T_12) (i.e., a third time point a3), the EMS 220 may generate a control signal for starting operation of the clutch 140 according to information or control signals received from the FATC 210, and may then transmit the generated control signal to the clutch 140.

Therefore, the clutch 140 may start operation of the clutch, may transmit power to the compressor 120, and may restart refrigerant movement according to the operation of the compressor 120, such that the temperature of the evaporator 180 may be gradually reduced during a fourth period (p4). In the instant case, the tilt angle of the swash plate 123 may be maintained within a relatively small range, such that the amount of refrigerant discharged from the compressor may also be maintained in a relatively small range.

As described above, since the compressor 120 repeats initiation and stoppage of the operation of the compressor 120, the temperature of the evaporator 180 may be changed while simultaneously vibrating within a predetermined range including the target temperature (T_t) as shown in FIG. 7.

As described above, when the predetermined temperature is relatively low and the set wind speed is high, the first lower limit threshold temperature (T_11) is compared with the second lower limit threshold temperature (T_12), such that the predetermined temperature is set to a relatively low temperature. When the first lower limit threshold temperature (T_21) is compared with the second lower limit threshold temperature (T_22) and the predetermined temperature is set to a relatively high temperature, the upper limit width and the lower limit width of a hysteresis curve are relatively increased. Therefore, the compressor 120 may more rapidly provide the indoor space 2 with the larger amount of cold air.

A method for controlling the temperature of the evaporator 180 when the predetermined temperature is relatively low and the set wind speed is high may be performed only when the vehicle 1 is running on the road. In other words, when the speed of the vehicle 1 is higher than zero "0", the FATC 210 and the EMS 220 may be designed to control the compressor 120 and the clutch 140 on the basis of the first lower limit threshold temperature (T_11) and the first upper limit threshold temperature (T_21).

A method for controlling the temperature of the evaporator 180 when the predetermined temperature is relatively high and the set wind speed is low will hereinafter be described with reference to the appended drawings.

Figure 8:
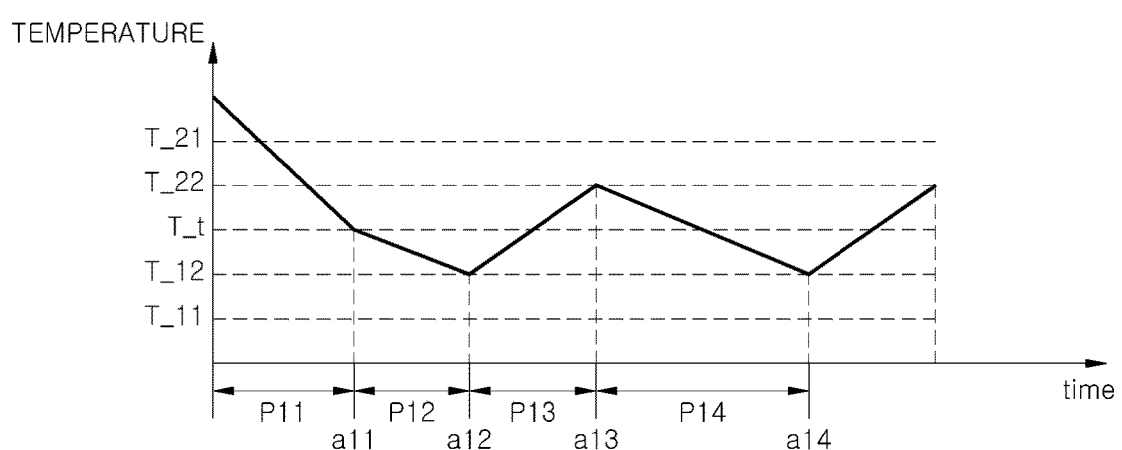
FIG. 8 is a second graph illustrating an exemplary operation of the air-conditioner according to various exemplary embodiments of the present invention.

FIG. 8 is a second graph illustrating an exemplary operation of the air-conditioner according to various exemplary embodiments of the present invention. In FIG. 8, the X-axis denotes time, and the Y-axis denotes a temperature of the evaporator. In FIG. 8, a segment denotes change in temperature of the evaporator 180.

When the predetermined temperature is relatively high and the set wind speed is low, the lower limit threshold temperature is defined as a relatively high temperature (i.e., the second lower limit threshold temperature T_12), and the upper limit threshold temperature is defined as a relatively low temperature (i.e., the second upper limit threshold temperature T_22).

When the target temperature (T_t) is established by the FATC 210, the clutch 140 may continuously operate during an $11^{th}$ period (p11) according to control of the FATC 210 and the EMS 220. In the instant case, the tilt angle of the swash plate 125 is set to a relatively high angle, for example, a maximum angle. The temperature of the evaporator 180 may be abruptly reduced as shown in FIG. 8.

When the temperature of the evaporator 180 reaches the target temperature (T_t) at the $11^{th}$ time point (a11), the FATC 210 may transmit a control signal to the swash plate controller 129, resulting in reduction of the tilt angle of the swash plate 123. The movement speed of refrigerant may be reduced according to the tilt angle of the swash plate 123, and the temperature of the evaporator 180 may be relatively smoothly reduced during a $12^{th}$ period (p12) according to reduction in the movement speed of refrigerant.

After the tilt angle of the swash plate 123 is reduced, the FATC 210 may continuously compare the actual measurement temperature of the evaporator 180 with the second lower limit threshold temperature (T_12). In the instant case, as shown in FIG. 8, the second lower limit threshold temperature (T_12) may be relatively higher than the first lower limit threshold temperature (T_11) when the predetermined temperature is relatively low and the set wind speed is high.

When the temperature of the evaporator 180 reaches a predetermined second lower limit threshold temperature (T_12) at the $12^{th}$ time point (a12), the EMS 220 may transmit a signal for stopping the clutch 140 to the clutch 140 according to information or control signals received from the FATC 210, and may stop transmission of power to the compressor 120 in response to the signal for stopping the clutch 140. Therefore, the temperature of the evaporator 180 may be gradually increased during a 13$^{th}$ period (p13).

The FATC 210 may compare the actual measurement temperature of the evaporator 180 with the second upper limit threshold temperature (T_22). Comparison between the actual measurement temperature of the evaporator 180 and the second upper limit threshold temperature (T_22) may be performed after stopping transmission of power to the compressor 120. In the instant case, as shown in FIG. 8, the second upper limit threshold temperature (T_22) may be relatively lower than the upper limit threshold temperature (i.e., a first upper limit threshold temperature T_22) when the predetermined temperature is relatively low and the set wind speed is high.

When the temperature of the evaporator 180 reaches a predetermined second upper limit threshold temperature (T_22) at the 13$^{th}$ time point (a13), the clutch 140 may restart operation according to control of the EMS 220, and may restart transmission of power to the compressor 120. Therefore, the temperature of the evaporator 180 may be gradually reduced during a 14$^{th}$ period (p14). In the instant case, the tilt angle of the swash plate 125 of the compressor 120 may be maintained at a relatively lower angle status (e.g., a minimum angle status).

The compressor 120 may continuously repeat initiation and stoppage of the above-mentioned operation, such that the temperature of the evaporator 180 may be changed to approximate to the target temperature (T_t) as shown in FIG. 8.

As described above, when the predetermined temperature is relatively high and the set wind speed is low, the second lower limit threshold temperature (T_12) may be determined to a relatively high threshold temperature. When the second upper limit threshold temperature (T_22) is set to a relatively low threshold temperature, the upper limit width and the lower limit width of the hysteresis curve are relatively reduced. Accordingly, power consumption of the compressor 120 may be relatively reduced, resulting in improvement in the energy consumption efficiency (e.g., fuel efficiency) of the vehicle 1.

A method for controlling the temperature of the evaporator 180 when the predetermined temperature is relatively high and the set wind speed is low may be performed only when the vehicle 1 is running on the road in the same manner as in the above-mentioned method for controlling the temperature of the evaporator 180 only when the predetermined temperature is relatively low and the set wind speed is high.

One exemplary embodiment of the air-conditioner 100 and the controller 200 when the compressor 110 is a fixed swash plate compressor will hereinafter be described with reference to the appended drawings.

Figure 9:
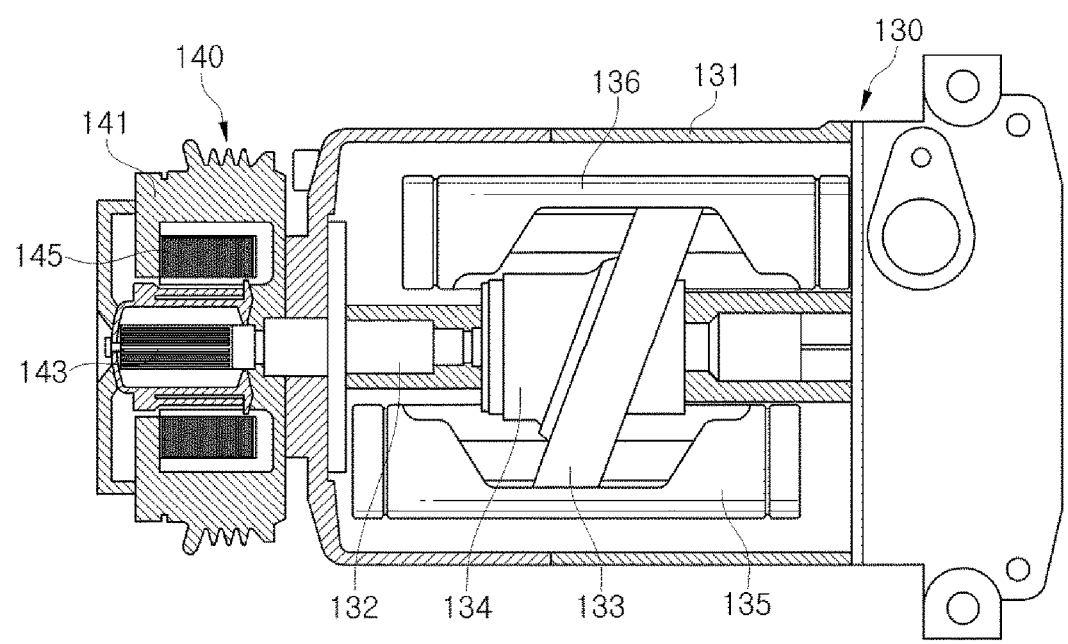
FIG. 9 is a view illustrating a compressor according to various exemplary embodiments of the present invention.

FIG. 9 is a view illustrating a compressor according to various exemplary embodiments of the present invention.

Referring to FIG. 9, the compressor 130 according to the various exemplary embodiments may include a case member 131; a rotation axis member 132 configured to rotate; a swash plate 133 coupled to the rotation axis member 132; and at least one piston 135 and 136 having a groove in which some parts of the swash plate 133 can be inserted.

The rotation axis member 132 may be connected to the rotation axis member 143 of the clutch 140, and may rotate in response to rotation of the rotation axis member 143 of the clutch 140.

A swash plate support portion 134 and a swash plate 133 may be fixed to the rotation axis member 132. The swash plate support portion 134 and the swash plate 133 may rotate in response to rotation of the rotation axis member 122.

Referring to FIG. 9, the swash plate 133 may be tilted at a predetermined tilt angle with respect to the rotation axis of the swash plate 133. In the instant case, the tilt angle of the swash plate 133 may be fixed such that the tilt angle of the swash plate 133 may be unchangeable. The swash plate 123 may be formed in a circular plate shape.

The pistons 135 and 136 may reciprocate within a predetermined range according to rotation of the swash plate 133. A groove may be formed in some parts of the pistons 135 and 136. Some parts of the swash plate 133 (e.g., the external circumferential surface of the swash plate 133 and a peripheral portion thereof) may be inserted into the groove. As described above, the swash plate 133 is tilted at a predetermined tilt angle. When the swash plate 133 rotates along the rotation axis, the groove of each piston 135 or 136 may move in response to rotation of the swash plate 123. Therefore, the pistons 135 and 136 may also be movable within a predetermined range.

As described above, the clutch 140 may be connected to the compressor 120.

The clutch 140 may include a case member 141; a rotation axis member 143 rotatable in the case member 141; and a coil 145 fixed to the case member 141 located in the vicinity of the rotation axis member 143 to generate a magnetic field according to flow of current.

When the magnetic field is formed in the vicinity of the coil 141, the rotation axis member 143 may rotate in a predetermined direction according to the formed magnetic field. In contrast, when the magnetic field is not formed in the vicinity of the coil 141, the rotation axis member 143 may not rotate. Accordingly, the rotation axis member 122 of the compressor 120 connected to the rotation axis member 143 of the clutch 140 may rotate or may not rotate according to rotation or non-rotation of the rotation axis member 143.

In accordance with the above-mentioned processes, information as to whether the compressor 130 operates may be controlled according to whether a current is applied to the coil 145 of the clutch 140.

Figure 10:
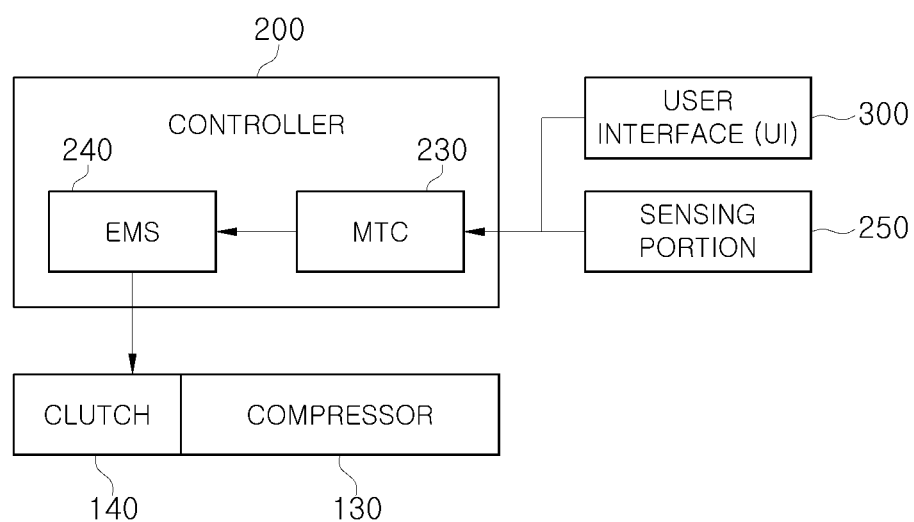
FIG. 10 is a conceptual diagram illustrating operations of the controller, the clutch, and the compressor according to various exemplary embodiments of the air-conditioner.

FIG. 10 is a conceptual diagram illustrating operations of the controller, the clutch, and the compressor according to various exemplary embodiments of the air-conditioner.

Referring to FIG. 10, the controller 200 may include a Manual Temperature Controller (MTC) 230 and an engine management system (EMS) 220.

The MTC 230 may determine whether to operate the clutch 140 on the basis of information received from the user interface (UI) 300. In accordance with one embodiment, the MTC 230 may determine whether to operate the clutch 140 using information as to whether to operate the compressor 130 or using an operation status of the compressor 130.

Information as to whether to operate the clutch 140 or a control signal corresponding to the information may be transferred to the EMS 220. Information as to whether to operate the clutch 140 or the control signal corresponding to the clutch 140 may be transferred using a cable or a wireless communication technology including CAN.

When using the MTC 230, a target temperature of the evaporator 180 may be fixed according to selection of a designer.

In addition, the MTC 230 may determine the lower limit threshold temperature and the upper limit threshold temperature on the basis of a user-selected predetermined temperature and a user-selected set wind speed received through the user interface (UI) 300.

In the same manner as described above, when the predetermined temperature is relatively low and the set wind speed is high, the MTC 230 may set the lower limit threshold temperature to a relatively low threshold temperature, and may set the upper limit threshold temperature to a relatively high threshold temperature. When the predetermined temperature is relatively high and the set wind speed is low, the MTC 230 may set the lower limit threshold temperature to a relatively high threshold temperature, and may set the upper limit threshold temperature to a relatively low threshold temperature.

As described above, the EMS 220 may receive information or a control signal related to the operation of the clutch 140 from the MTC 230, may generate a control signal for the clutch 140 in response to the received information, and may transmit the control signal to the clutch 140.

Referring to FIG. 10, the MTC 230 may not transmit the control signal to the compressor 130 in a different way from the FATC 210.

A method for controlling the temperature of the evaporator 180 when the predetermined temperature is relatively low and the set wind speed is high will hereinafter be described with reference to the appended drawings.

Figure 11:
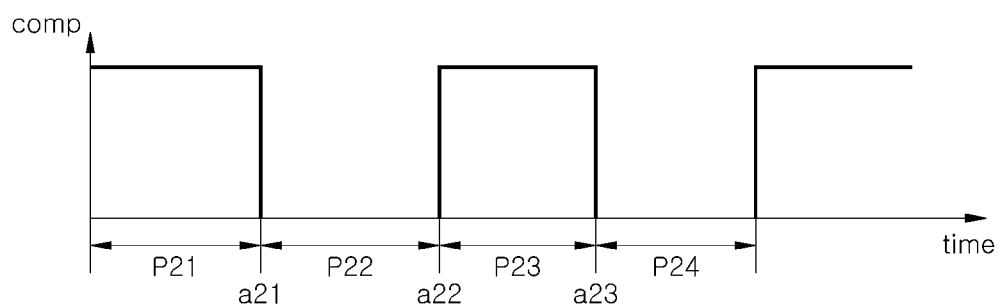
FIG. 11 is a conceptual diagram illustrating the change of power of the compressor according to the various exemplary embodiments of the present invention.
Figure 12:
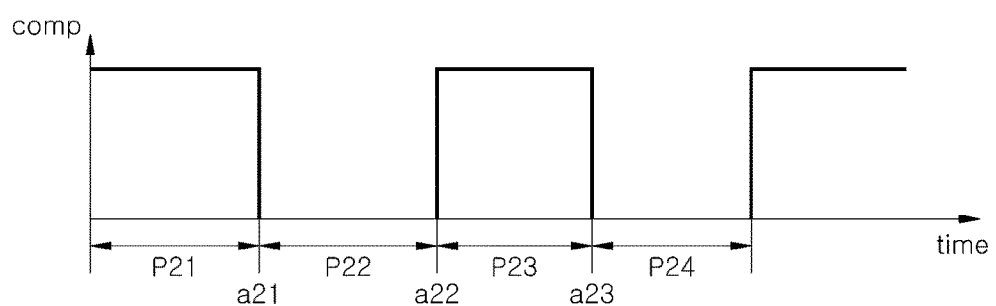
FIG. 12 is a first graph illustrating an exemplary operation of the air-conditioner according to the various exemplary embodiments of the present invention.

FIG. 11 is a conceptual diagram illustrating the change of power of the compressor according to the various exemplary embodiments of the present invention. FIG. 12 is a first graph illustrating an exemplary operation of the air-conditioner according to the various exemplary embodiments of the present invention. In FIGS. 11 and 12, the X-axis denotes time. In FIG. 11, a Y-axis may denote the magnitude of power of the compressor 130. In FIG. 12, a Y-axis may denote a temperature of the evaporator, and a segment may denote change in temperature of the evaporator 180.

When the predetermined temperature is relatively low and the set wind speed is relatively high, the lower limit threshold temperature may be determined to a third lower limit threshold temperature (T_31) relatively lower than a fourth lower limit threshold temperature (T_32), and the upper limit threshold temperature may be determined to a third upper limit threshold temperature (T_41) relatively higher than a fourth upper limit threshold temperature (T_42).

The clutch 140 may continuously transmit power to the compressor 130 during a 21$^{st}$ period (p21) according to control of the MTC 230 and the EMS 220, and the compressor 130 may operate in response to transmission of the power as shown in FIG. 11. Therefore, the temperature of the evaporator 180 may abruptly decrease as shown in FIG. 12, and may be identical to or may approximate to the target temperature (T_t).

In the instant case, the compressor 130 may continuously operate until the temperature of the evaporator 180 reaches the third lower limit threshold temperature (T_31) relatively lower than the target temperature (T_t).

The MTC 230 may periodically or aperiodically compare the actual measurement of the evaporator 180 received from the evaporator temperature detecting portion 259 with a predefined third lower limit threshold temperature (T_31).

When the temperature of the evaporator 180 reaches the predetermined third lower limit threshold temperature (T_31) at the 21$^{st}$ time point (a21), the EMS 220 may generate a control signal for stopping the clutch according to information or control signal received from the MTC 230, and may transmit the generated control signal to the clutch 140.

In response to reception of the control signal for stopping the clutch, the clutch 140 may stop transmission of power to the compressor 130. Therefore, as shown in FIG. 11, the compressor 130 may stop operation, and refrigerant movement may be stopped according to stoppage of the compressor 130. Therefore, the temperature of the evaporator 180 may be gradually increased during a 22$^{nd}$ period (p22).

Subsequently, the FATC 210 may periodically or aperiodically compare the actual measurement temperature of the evaporator 180 with the third upper limit threshold temperature (T_41).

When the temperature of the evaporator 180 reaches a predetermined third upper limit threshold temperature (T_41) at the 22$^{nd}$ time point (a22), the EMS 220 may generate a signal for starting operation of the clutch according to information or a control signal received from the MTC 230, and may transmit the generated signal to the clutch 140.

The clutch 140 may transmit power to the compressor 130 in response to the signal for starting operation of the clutch, and the compressor 130 may restart operation. The refrigerant may flow according to initiation of the compressor 130, and the temperature of the evaporator 180 may gradually decrease during a 23$^{rd}$ period (p23).

Sequentially, the MTC 230 may compare the actual measurement temperature of the evaporator 180 with a third lower limit threshold temperature (T_31). When the actual measurement temperature of the evaporator reaches the third lower limit threshold temperature (T_31) at a 23$^{rd}$ time point (p23), the clutch 140 may stop transmission of power to the compressor 30 according to operations of the MTC 230 and the EMS 220, and the temperature of the evaporator 180 may gradually increase during a 24$^{th}$ period (p24).

As described above, the compressor 130 may repeat initiation and stoppage of the operation according to control of the MTC 230 and the EMS 220, such that the temperature of the evaporator 180 may be changed within the range including the target temperature (T_t).

In accordance with one embodiment, a method for controlling the temperature of the evaporator 180 when the above-mentioned fixed swash plate compressor 130 is used may be performed only when the vehicle 1 is running on the road. In other words, the MTC 230 and the EMS 220 may be designed to process the above-mentioned step only when the speed of the vehicle 1 exceeds zero "0".

A method for controlling the temperature of the evaporator 180 only when the predetermined temperature is relatively high and the set wind speed is low will hereinafter be described with reference to the appended drawings.

Figure 13:
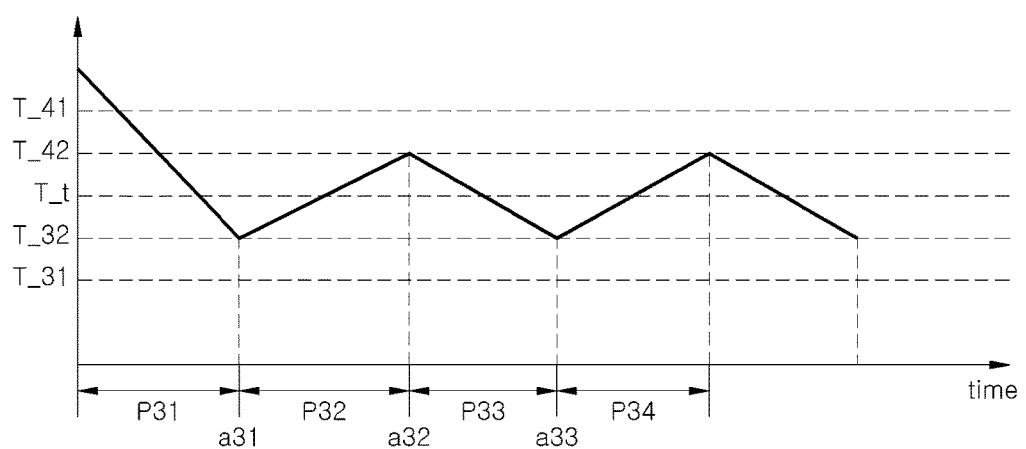
FIG. 13 is a second graph illustrating an exemplary operation of the air-conditioner according to the various exemplary embodiments of the present invention.

FIG. 13 is a second graph illustrating an exemplary operation of the air-conditioner according to the various exemplary embodiments of the present invention. In FIG. 13, the X-axis denotes time, and the Y-axis denotes a temperature of the evaporator. In FIG. 13, a segment denotes change of the temperature of the evaporator 180.

When the predetermined temperature is relatively high and the set wind speed is low, the MTC 230 may set the lower limit threshold temperature (hereinafter referred to as a fourth lower limit threshold temperature T_elatively low threshold temperature, and may set the upper limit threshold temperature (hereinafter referred to as a fourth upper limit threshold temperature T_42) to a relatively high threshold temperature.

The clutch 140 and the compressor 130 may continuously operate during a 31$^{st}$ period (p31) according to control of the MTC 230 and the EMS 220. The temperature of the evaporator 180 may be reduced by operation of the compressor 130 as shown in FIG. 13. The temperature of the evaporator 180 may reach a target temperature (T_t) or a specific value approximating to the target temperature (T_t). In the instant case, the compressor 130 may continuously operate even when the temperature of the evaporator 180 reaches the target temperature (T_t) or the specific value approximating to the target temperature (T_t).

The MTC 230 may compare the actual measurement temperature of the evaporator 180 with the fourth lower limit threshold temperature (T_32). As shown in FIG. 13, the fourth lower limit threshold temperature (T_32) may be relatively higher than the third lower limit threshold temperature (T_31) used when the predetermined temperature is relatively low and the set wind speed is high.

When the temperature of the evaporator 180 reaches the fourth lower limit threshold temperature (T_32) at the $31^{st}$ time point (a31), the MTC 230 may decide to stop operation of the clutch 140, and may transmit the determined result or a control signal corresponding to the determined result to the EMS 220.

The EMS 220 may transmit a signal for stopping the clutch to the clutch 140, and the clutch 140 may stop transmission of power to the compressor 130 in response to the signal for stopping the clutch. Accordingly, the temperature of the evaporator 180 may be gradually increased during a $32^{nd}$ period (p32).

Subsequently, the MTC 230 may compare the actual measurement temperature of the evaporator 180 with the fourth upper limit threshold temperature (T_42). As shown in FIG. 13, the fourth upper limit threshold temperature (T_42) may be relatively lower than the third upper limit threshold temperature (T_41) when the predetermined temperature is relatively low and the set wind speed is high.

When the temperature of the evaporator 180 reaches a predetermined fourth upper limit threshold temperature (T_42) at the $32^{nd}$ time point (a32), the clutch 140 may restart transmission of power to the compressor 120 according to the determined result of the MTC 230 and control of the EMS 220. Accordingly, the compressor 120 may restart operation, and the temperature of the evaporator 180 may be gradually reduced during a $33^{rd}$ period (p33).

Sequentially, the MTC 230 may compare the fourth lower limit threshold temperature (T_32) with the actual measurement temperature of the evaporator 180. When the fourth lower limit threshold temperature (T_32) is identical to the actual measurement temperature of the evaporator 180 at a time point (a33), the EMS 220 may transmit a control signal to the clutch 140 such that the compressor 130 stops operation. Accordingly, the temperature of the evaporator 180 may be increased during a $34^{th}$ period (p34).

As described above, according to decision and control of the MTC 230 and the EMS 220, the compressor 120 may repeat initiation and stoppage of the operation of the compressor 120, such that the temperature of the evaporator 180 may be changed to approximate to the target temperature (T_t).

A method for controlling the temperature of the evaporator 180 may also be conducted only when the vehicle 1 is running on the road.

In accordance with one embodiment, instead of the compressor 120 (i.e., the external variable swash plate compressor) according to the various exemplary embodiments or the compressor 130 (i.e., the fixed swash plate compressor) according to the various exemplary embodiments, the internal variable swash plate compressor may be used. In the instant case, the decision and control operation of the controller 200 and the operation of the compressor 120 or 130 may also be applied to or may be partially modified in the case in which the internal variable swash plate compressor is used.

Various embodiments of the method for controlling the air-conditioner will hereinafter be described with reference to FIG. 14, and FIG. 15.

Figure 14:
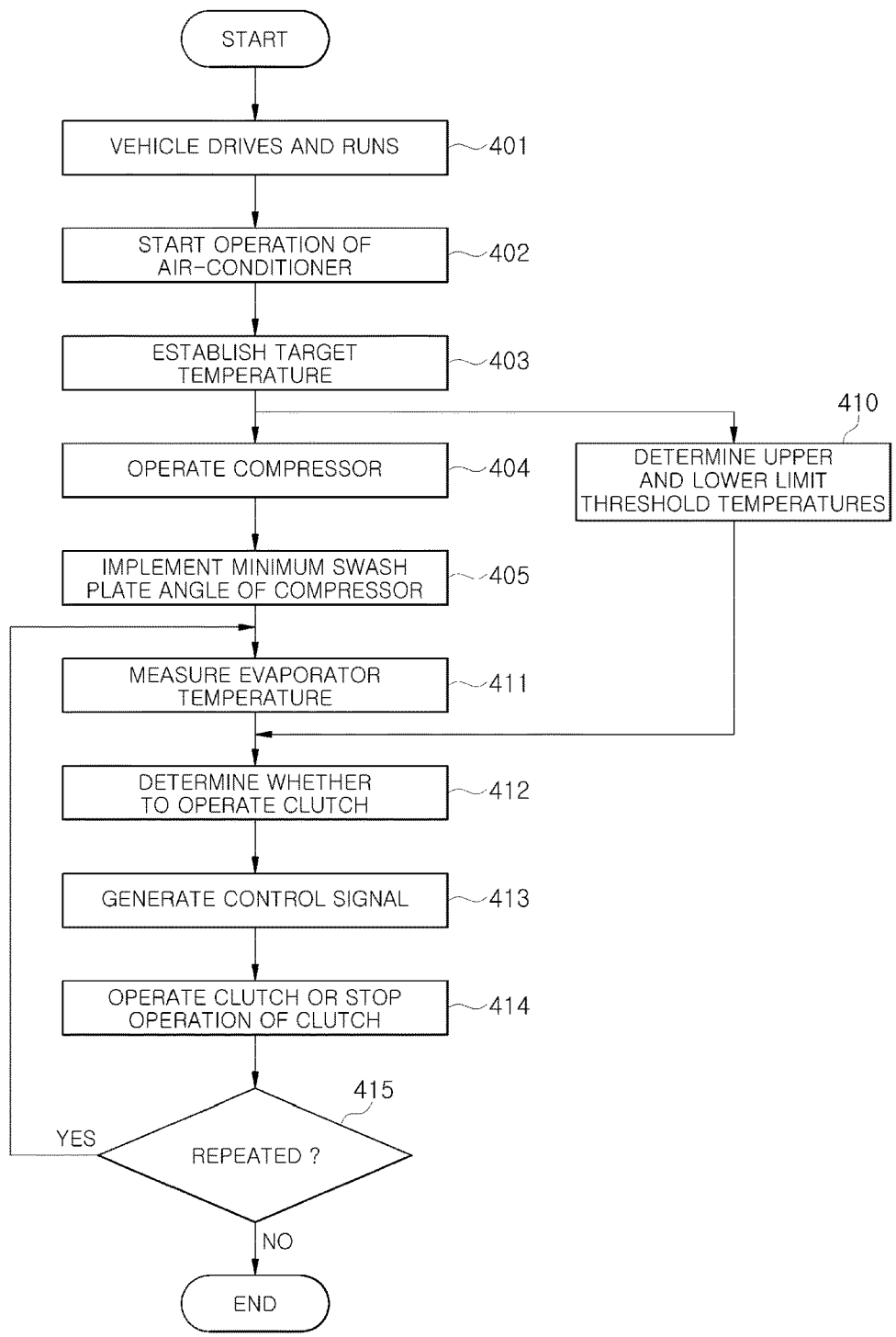
FIG. 14 is a flowchart illustrating a method for controlling the air-conditioner according to the various exemplary embodiments.

FIG. 14 is a flowchart illustrating a method for controlling the air-conditioner according to the various exemplary embodiments. FIG. 14 is a flowchart illustrating an exemplary method for controlling the air-conditioner when the external variable swash plate compressor is used.

Referring to FIG. 14, the vehicle starts operation and then runs on the road (401).

A power-supply voltage may be applied to the air-conditioner of the vehicle according to either user interface (UI) manipulation of the user or the predefined setting, and the air-conditioner may start operation (402).

Simultaneously with initiation of the operation of the air-conditioner, or before or after the operation of the air-conditioner, a target temperature of the indoor space of the vehicle may be established, such that a target temperature of the evaporator of the air-conditioner may also be established according to the target temperature of the indoor space (403).

When the target temperature of the evaporator is established, the compressor starts operation such that the temperature of the evaporator or the ambient air temperature of the evaporator can reach a target temperature (404). In the instant case, the tilt angle of the swash plate of the compressor may be determined to a relatively high tilt angle. For example, the tilt angle of the swash plate may be determined to a maximum tilt angle.

When the temperature of the evaporator or the ambient air temperature of the evaporator reaches or approximates to a target temperature, the tilt angle of the swash plate may be determined to a relatively low tilt angle (405). For example, the tilt angle of the swash plate may be determined to a minimum angle.

In accordance with one embodiment, the tilt angle of the swash plate may also be gradually reduced in response to the temperature of the evaporator or the change of the ambient air temperature of the evaporator. In other words, the relationship between the tilt angle of the swash plate and any one of the temperature of the evaporator and the ambient air temperature of the evaporator may be defined as a predetermined linear function. The controller of the vehicle may determine the tilt angle of the swash plate by applying the temperature of the evaporator or the ambient air temperature of the evaporator to the linear function, and may control the swash plate according to the determined tilt angle.

After the temperature of the evaporator or the ambient air temperature of the evaporator reaches or approximates to a target temperature, the temperature of the evaporator or the ambient air temperature of the evaporator may be continuously measured periodically or aperiodically.

In the meantime, after the target temperature is established (403), the upper limit threshold temperature and the lower limit threshold temperature may also be decided (410). Determining the upper limit threshold temperature and the lower limit threshold temperature may be performed simultaneously with any one of implementation (405) of a minimum swash plate angle or measurement (411) of the evaporator temperature, or may be performed before or after execution of any one of the operations 404, 405 and 405 as necessary.

The upper limit threshold temperature and the lower limit threshold temperature may be variable according to the predetermined temperature and the set wind speed.

In more detail, when the predetermined temperature is relatively low and the wind speed is relatively high, the upper limit threshold temperature may be determined to a relatively high threshold temperature. When the predetermined temperature is relatively high and the wind speed is relatively low, the upper limit threshold temperature may be determined to a relatively low threshold temperature.

In addition, when the predetermined temperature is relatively low and the wind speed is relatively high, the lower limit threshold temperature may be determined to a relatively low threshold temperature. When the predetermined temperature is relatively high and the wind speed is relatively low, the lower limit threshold temperature may be determined to a relatively high threshold temperature.

Therefore, when the predetermined temperature is relatively low and the wind speed is relatively high, a difference between the upper limit threshold temperature and the lower limit threshold temperature may be relatively increased. When the predetermined temperature is relatively high and the wind speed is relatively low, a difference between the upper limit threshold temperature and the lower limit threshold temperature may be relatively reduced.

To determine the upper limit threshold temperature and the lower limit threshold temperature, a predetermined linear function may be used.

The vehicle may decide whether to operate the clutch on the basis of the actual measurement temperature of the evaporator, the upper limit threshold temperature, and the lower limit threshold temperature (412). The clutch may transmit power to the compressor of the air-conditioner or may prevent power from being supplied to the compressor of the air-conditioner. In accordance with one embodiment, prior to deciding whether to operate the clutch, information as to whether or not the vehicle runs on the road may further be determined (413).

For example, when the actual measurement temperature of the evaporator reaches the lower limit threshold temperature, a control signal for stopping the clutch may be generated. In addition, after stopping operation of the compressor, when the temperature of the evaporator increases and reaches the upper limit threshold temperature, a control signal for restarting the operation of the clutch may be generated.

The clutch may receive a control signal, and may perform a predetermined operation in response to the received control signal (414).

For example, when the control signal for stopping operation of the clutch is received by the clutch, the clutch may stop transmission of power to the compressor. Therefore, when the actual measurement temperature of the evaporator reaches the lower limit threshold temperature, the compressor stops operation. The temperature of the evaporator or the ambient air temperature of the evaporator may increase according to stoppage of the compressor.

In another example, when the control signal for restarting operation of the clutch is received by the clutch, the clutch may re-provide power to the compressor. Therefore, when the actual measurement temperature of the evaporator reaches the upper limit threshold temperature, the compressor may restart operation, and the temperature of the evaporator or the ambient air temperature of the evaporator may be reduced in response to restart of the compressor.

The operation 411 for measuring the evaporator temperature, the operation 412 for deciding whether to operate the clutch, the operation 413 for generating the control signal, and the operation 414 for starting or stopping the clutch may be repeated at least once (415). Repetition 415 of the operation 411 for measuring the evaporator temperature, the operation 412 for deciding whether to operate the clutch, the operation 413 for generating the control signal, and the operation 414 for starting or stopping the clutch may be completed according to achievement of various conditions. For example, the above-mentioned repetition 415 may be stopped for various reasons, for example, when the air-conditioner stops operation according to user manipulation or predefined setting, when the vehicle stops running on the road, or when a target temperature of the indoor space is changed according to user manipulation or the predefined setting.

Figure 15:
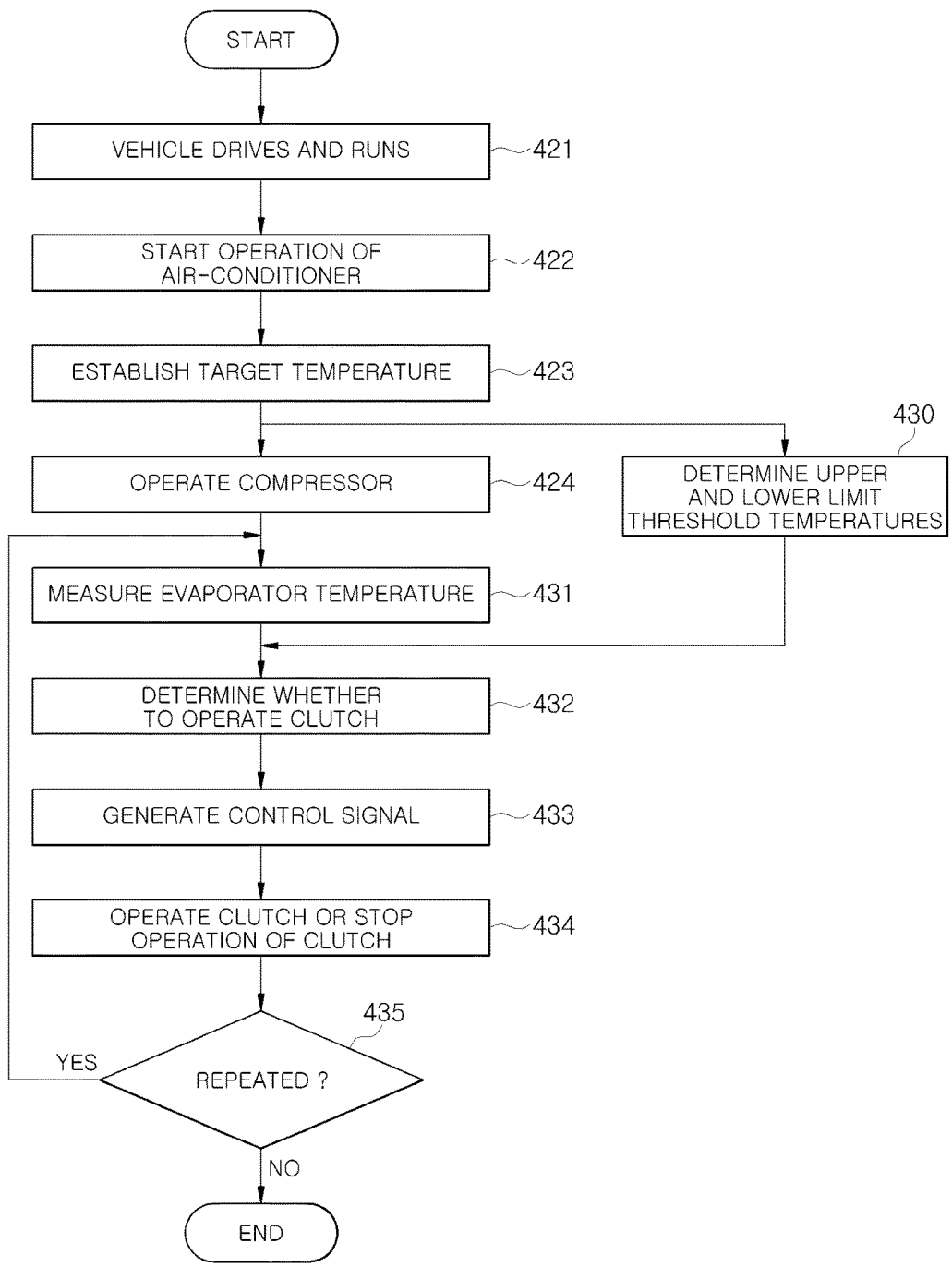
FIG. 15 is a flowchart illustrating a method for controlling the air-conditioner according to various exemplary embodiments of the present invention.

FIG. 15 is a flowchart illustrating a method for controlling the air-conditioner according to various exemplary embodiments of the present invention. FIG. 15 is a flowchart illustrating an exemplary method for controlling the air-conditioner when the air-conditioner users the fixed swash plate compressor.

Referring to FIG. 15, the vehicle starts operation and then runs on the road (421).

The air-conditioner of the vehicle may start operation according to user interface (UI) manipulation of the user or the predefined setting (422).

A target temperature of the indoor space of the vehicle may be established, and the target temperature of the evaporator of the air-conditioner may also be established according to the target temperature of the indoor space (423). Establishing the target temperature of the evaporator may be performed simultaneously with initiation of the operation of the air-conditioner or before or after initiation of the operation of the air-conditioner.

When the target temperature of the evaporator is established, the compressor starts operation such that the temperature of the evaporator or the ambient air temperature reaches the target temperature (424). Since the tilt angle of the swash plate of the compressor is fixed, the piston may reciprocate within a fixed range.

Refrigerant may flow in the air-conditioner according to operation of the compressor, and the temperature of the evaporator or the ambient air temperature of the evaporator may be cooled.

The temperature of the evaporator or the ambient air temperature may be periodically or aperiodically measured (431). The operation for measuring the temperature of the evaporator or the ambient air temperature of the evaporator may be performed even in the operation 242 of the compressor.

When the target temperature is established, the vehicle may determine the upper limit threshold temperature and the lower limit threshold temperature (430). The operation 430 for determining the upper limit threshold temperature and the lower limit threshold temperature may be performed simultaneously with the compressor operation 424 or before or after the compressor operation 424.

As described above, the upper limit threshold temperature and the lower limit threshold temperature may be changeable according to the predetermined temperature and the set wind speed.

In more detail, when the predetermined temperature is relatively low and the wind speed is relatively high, the vehicle may set the upper limit threshold temperature to a relatively high threshold temperature. When the predetermined temperature is relatively high and the wind speed is relatively low, the vehicle may set the upper limit threshold temperature to a relatively low threshold temperature.

When the predetermined temperature is relatively low and the wind speed is relatively high, the vehicle may set the lower limit threshold temperature to a relatively low threshold temperature. When the predetermined temperature is relatively high and the wind speed is relatively low, the vehicle may set the lower limit threshold temperature to a relatively high threshold temperature.

As described above, to determine the upper limit threshold temperature and the lower limit threshold temperature, a predetermined linear function may also be used as necessary.

The vehicle may determine whether to operate the clutch on the basis of the actual measurement temperature of the evaporator, the upper limit threshold temperature, and the lower limit threshold temperature (432), such that a control signal for the clutch may be generated by the controller of the vehicle according to the determined result (433). In accordance with one embodiment, prior to determining whether to operate the clutch 432, information as to whether or not the vehicle runs on the road may further be determined.

For example, when the actual measurement temperature of the evaporator reaches the lower limit threshold temperature, the control signal for stopping the clutch is generated. When the evaporator temperature reaches the upper limit threshold temperature, a control signal for restarting the operation of the clutch may be generated.

The clutch may receive a control signal, and may perform a predetermined operation corresponding to the control signal in response to reception of the control signal (434).

For example, when the control signal for stopping operation of the clutch is received by the clutch, the clutch may stop transmission of power to the compressor, such that the compressor may stop operation. Therefore, when the actual measurement temperature of the evaporator reaches the lower limit threshold temperature, the compressor may stop operation.

In another example, when the control signal for restarting operation of the clutch is received by the clutch, the clutch may re-provide power to the compressor such that the compressor can operate. Therefore, when the actual measurement temperature of the evaporator reaches the upper limit threshold temperature, the compressor may restart operation.

The operation 431 for measuring the evaporator temperature, the operation 413 for deciding whether to operate the clutch, the operation 433 for generating the control signal, and the operation 434 for starting or stopping the clutch may be repeated at least once (435), and may be stopped according to user manipulation or the predefined setting.

The above-mentioned air-conditioner control method included in the exemplary embodiments of the present invention may be implemented in a form of programs executable by a variety of computer means. In the instant case, the program may include program commands, data files, data structures, etc. individually or in combination. Here, the program may include, for example, high-level language codes executable by a computer using an interpreter as well as machine language codes generated by a complier. In addition, the program may be designed and configured to implement the above-mentioned air-conditioner control method, or may also be implemented using various functions or definitions well-known to those skilled in the art related to computer software.

The program for implementing the above-mentioned air-conditioner control method according to embodiments of the present invention may be written in computer readable media. Examples of the computer readable media may include magnetic disc storage media including a hard disc or a floppy disc, and a magnetic tape, optical media including a compact disc (CD) and a digital versatile disc (DVD), magneto-optical media including a floptical disc, and hardware devices including semiconductor storage devices (e.g., a read only memory (ROM), a random access memory (RAM), and a flash memory), which are configured to store and execute specific programs executed by computers or the like.

As is apparent from the above description, the air-conditioner, the vehicle including the air-conditioner, and the method for controlling the air-conditioner according to the embodiments of the present invention can allow the air-conditioner to be more efficiently and economically operable by properly controlling a clutch connected to the compressor.

The air-conditioner, the vehicle including the air-conditioner, and the method for controlling the air-conditioner according to the embodiments of the present invention can prevent the compressor from operating more than needed according to a control signal of the clutch, can minimize unnecessary power consumption of the compressor while simultaneously maintaining appropriate cooling performance.

The air-conditioner, the vehicle including the air-conditioner, and the method for controlling the air-conditioner according to the embodiments of the present invention can properly control the compressor of the air-conditioner in various ways, can improve fuel efficiency by reducing loss caused by vehicle driving, and can minimize fluctuation in cooling performance.

The air-conditioner, the vehicle including the air-conditioner, and the method for controlling the air-conditioner according to the embodiments of the present invention can more properly control a fixed swash plate compressor.

The control method of the air conditioner according to the above-described embodiments can be implemented in a form of a program that can be driven by various computer devices. Here, the program may include program commands, data files, data structures, and the like, alone or in combination. The program may be designed and manufactured using machine code or high-level language code. The program may be specially designed to implement the control method of the air conditioner described above or may be implemented using various functions or definitions that are well-known and available to a person having ordinary skill in the art.

The program for implementing the control method of the air conditioner may be stored in a recording medium readable by a computer. The recording medium readable by a computer may include various types of hardware devices that is configured to store a specific program that is executed by a computer. For example, the hardware device may include, a magnetic disk storage medium including a hard disk or a floppy disk, a magnetic tape, an optical medium including a compact disk (CD) or a digital versatile disk (DVD) A magneto-optical media including a floppy disk and a semiconductor storage device including a ROM, a RAM or a flash memory, and the like.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air-conditioner comprising:
an evaporator;
a compressor configured to compress refrigerant supplied to the evaporator; and
a clutch configured to transmit power needed to operate the compressor to the compressor or to prevent power from being supplied to the compressor,
wherein the clutch prevents power from being supplied to the compressor when a measurement temperature of the evaporator reaches a lower limit threshold temperature from above the lower limit threshold temperature selected among the lower limit threshold temperature and an upper limit threshold temperature;
the lower limit threshold temperature is changeable, and the upper limit threshold temperature is higher than the lower limit threshold temperature and is changeable; and
at least one of the lower limit threshold temperature and the upper limit threshold temperature is determined on a basis of a user-selected predetermined temperature and a user-selected set wind speed.

2. The air-conditioner according to claim 1, wherein after preventing the power from being supplied to the compressor, when the measurement temperature of the evaporator reaches the upper limit threshold temperature, the clutch is configured to provide the compressor with power needed to operate the compressor.

3. The air-conditioner according to claim 1, wherein the clutch is configured to operate until a temperature of the evaporator reaches a target temperature.

4. The air-conditioner according to claim 3, wherein after the temperature of the evaporator reaches the target temperature, when the measurement temperature of the evaporator reaches the lower limit threshold temperature, the clutch is configured to prevent power from being supplied to the compressor.

5. The air-conditioner according to claim 1, wherein the lower limit threshold temperature is set to be lower and the upper limit threshold temperature is set to be higher as the predetermined temperature is lower or as the set wind speed is higher.

6. The air-conditioner according to claim 1, wherein the lower limit threshold temperature is set to be higher and the upper limit threshold temperature is set to be lower as the predetermined temperature is higher or as the set wind speed is lower.

7. The air-conditioner according to claim 1, wherein when the measurement temperature of the evaporator is lower than the lower limit threshold temperature, the clutch prevents power from being supplied to the compressor.

8. The air-conditioner according to claim 1, wherein the compressor includes a swash plate in which a tilt angle is fixed.

9. The air-conditioner according to claim 1, wherein the compressor includes a swash plate in which a tilt angle is changeable, and
when the tilt angle of the swash plate is a minimum tilt angle, a controller controls the clutch to be operated according to the lower limit threshold temperature and the upper limit threshold temperature.

10. The air-conditioner according to claim 9, wherein the controller determines a target temperature using at least one of an indoor temperature, an outdoor temperature, a refrigerant pressure, an indoor humidity, a temperature of the evaporator, the predetermined temperature, and the set wind speed; and
the controller determines the clutch to transmit power to the compressor until the temperature of the evaporator reaches the target temperature.

11. A vehicle comprising:
an evaporator;
a compressor configured to compress refrigerant supplied to the evaporator;
a clutch configured to transmit power needed to operate the compressor to the compressor or to prevent power from being supplied to the compressor;
a user interface (UI) configured to receive information regarding a user-selected predetermined temperature and a user-selected set wind speed; and
a controller configured to determine a target temperature, a lower limit threshold temperature, and an upper limit threshold temperature, and control the clutch to prevent power from being supplied to the compressor when a measurement temperature of the evaporator reaches the lower limit threshold temperature from above the lower limit threshold temperature,
wherein the lower limit threshold temperature is changeable, and the upper limit threshold temperature is higher than the lower limit threshold temperature and is changeable.

12. The vehicle according to claim 11, wherein the clutch is configured to operate according to the lower limit threshold temperature and the upper limit threshold temperature only when the vehicle is running.

13. The vehicle according to claim 12, further including:
a detector configured to detect at least one of an indoor temperature, an outdoor temperature, a refrigerant pressure, an indoor humidity, and a temperature of the evaporator.

14. The vehicle according to claim 11, wherein after preventing the power from being supplied to the compressor, when the measurement temperature of the evaporator reaches the upper limit threshold temperature, the controller is configured to control the clutch to provide the compressor with power needed to operate the compressor.

15. A method for controlling an air-conditioner comprising:
determining a lower limit threshold temperature and an upper limit threshold temperature;
acquiring a measurement temperature of an evaporator; and
when the measurement temperature of the evaporator reaches the lower limit threshold temperature from above the lower limit threshold temperature selected among the upper limit threshold temperature and the lower limit threshold temperature, allowing a clutch connected to a compressor to prevent power from being supplied to the compressor, wherein the lower limit threshold temperature is changeable, and the upper limit threshold temperature is higher than the lower limit threshold temperature and is changeable, and wherein the determining the lower limit threshold temperature and the upper limit threshold temperature includes:

receiving information regarding a predetermined temperature and a set wind speed; and determining the lower limit threshold temperature and the upper limit threshold temperature on a basis of the predetermined temperature and the set wind speed.

16. The method according to claim 15, further including:
after preventing the power from being supplied to the compressor, when the measurement temperature of the evaporator reaches the upper limit threshold temperature, transmitting, by the clutch, power needed to operate the compressor to the compressor.

17. The method according to claim 15, wherein the determining at least one of the lower limit threshold temperature and the upper limit threshold temperature on the basis of the predetermined temperature and the set wind speed includes:

determining the lower limit threshold temperature to be lower, and determining the upper limit threshold temperature to be higher as the predetermined temperature is lower or as the set wind speed is higher.

18. The method according to claim 15, wherein the determining at least one of the lower limit threshold temperature and the upper limit threshold temperature on the basis of the predetermined temperature and the set wind speed includes:

determining the lower limit threshold temperature to be higher and determining the upper limit threshold temperature to be lower as the predetermined temperature is lower or as the set wind speed is higher.

19. The method according to claim 15, further including:
when the measurement temperature of the evaporator is lower than the lower limit threshold temperature, allowing the clutch to prevent power from being supplied to the compressor.

20. The method according to claim 15, wherein the compressor includes a swash plate in which a tilt angle is fixed.

21. The method according to claim 15,
wherein the compressor includes a swash plate in which a tilt angle is changeable, and
wherein the method further includes:
determining whether the tilt angle of the swash plate is a minimum tilt angle.

22. The method according to claim 21, further including:
determining a target temperature using at least one of an indoor temperature, an outdoor temperature, a refrigerant pressure, an indoor humidity, a temperature of the evaporator, the predetermined temperature, and the set wind speed.

23. The method according to claim 22, further including:
determining whether the temperature of the evaporator reaches the target temperature.

24. The method according to claim 23, further including:
allowing the clutch to transmit power needed to operate the compressor to the compressor until the temperature of the evaporator reaches the target temperature.

25. The method according to claim 15, wherein the allowing the clutch connected to the compressor to prevent power from being supplied to the compressor when the measurement temperature of the evaporator reaches the lower limit threshold temperature selected among the upper limit threshold temperature and the lower limit threshold temperature is conducted when a tilt angle of a swash plate is a minimum tilt angle.

26. The method according to claim 15, further including:
determining whether a vehicle is running.

* * * * *